(12) United States Patent
Border et al.

(10) Patent No.: US 12,176,994 B2
(45) Date of Patent: Dec. 24, 2024

(54) DYNAMIC INROUTE RECONFIGURATION OF SATELLITE NETWORK COMMUNICATION SYSTEMS

(71) Applicant: Hughes Network Systems, LLC, Germantown, MD (US)

(72) Inventors: John Leonard Border, Middletown, MD (US); Murali Regunathan, Washington, DC (US); Jayant Sonrexa, Germantown, MD (US); Robert James Torres, New Market, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 426 days.

(21) Appl. No.: 17/566,214

(22) Filed: Dec. 30, 2021

(65) Prior Publication Data

US 2022/0209853 A1 Jun. 30, 2022

Related U.S. Application Data

(60) Provisional application No. 63/133,051, filed on Dec. 31, 2020.

(51) Int. Cl.
*H04B 7/185* (2006.01)

(52) U.S. Cl.
CPC ..... *H04B 7/18513* (2013.01); *H04B 7/18532* (2013.01); *H04B 7/18543* (2013.01); *H04B 7/18582* (2013.01); *H04B 7/18584* (2013.01)

(58) Field of Classification Search
CPC ............ H04B 7/18532; H04B 7/18543; H04B 7/18582; H04B 7/18584

USPC .......................................................... 342/352
See application file for complete search history.

(56) References Cited

U.S. PATENT DOCUMENTS

2018/0234166 A1* 8/2018 Peponides ............... H04L 43/16
2018/0309508 A1* 10/2018 Regan ................ H04B 7/18584

OTHER PUBLICATIONS

International Search Report and Written Opinion issued Apr. 12, 2022 in corresponding PCT/US2021/065826.

(Continued)

*Primary Examiner* — Harry K Liu
(74) *Attorney, Agent, or Firm* — NovoTechIP International PLLC

(57) ABSTRACT

Dynamic in-route reconfiguration in a satellite network includes receiving at least one of transmit power capability and demand requirements from one or more active satellite terminals of the satellite network, determining a resulting in-route configuration during operation of the satellite network based on the received at least one of transmit power capability and demand requirements, comparing the determined resulting in-route configuration to a current in-route configuration. When the determined resulting in-route configuration is different from the current in-route configuration, establishing the determined resulting in-route configuration as the current in-route configuration and storing the established current in-route configuration in a dynamic in-route reconfiguration manager, and transmitting the established current in-route configuration to the one or more active satellite terminals.

16 Claims, 20 Drawing Sheets

(56) References Cited

OTHER PUBLICATIONS

Vanderpoorten et al., "Flexible Modem Interface Demonstration for Military Terminals," MILCOM 2019—2019 IEEE Military Communications Conference (MILCOM), IEEE, Nov. 12, 2019 (Nov. 12, 2019), pp. 1-8.

Vanderpoorten et al., "Flexible modem interface—Enabling DoD wideband SATCOM enterprise," MILCOM 2017—2017 IEEE Military Communications Conference (MILCOM), IEEE, Oct. 23, 2017 (Oct. 23, 2017), pp. 128-134.

Ravishankar et al., "Next-generation global satellite system with mega-constellations," International Journal of Satellite Communications and Networking, vol. 39, No. 1, Jul. 24, 2020 (Jul. 24, 2020), pp. 6-28.

* cited by examiner

| Beam ID | Inroute MHz Carveout Name | Inroute MHz Band Name | Uplink Band Name | Start Edge Uplink Ka-band (GHz) | End Edge Uplink Ka-band (GHz) | Satellite LO Frequency (GHz) | Downlink Band Name | Start Edge Downlink Q-band (GHz) | End Edge Downlink Q-band (GHz) | RFT BDC LO Frequency (GHz) | Start Edge Downlink L-band (GHz) | End Edge Downlink L-band (GHz) |
|---|---|---|---|---|---|---|---|---|---|---|---|---|
| 1 | Beam 1 | B1 RA | RA | 29.300 | 29.500 | 11.300 | LG | 40.600 | 40.800 | 38.000 | 2.600 | 2.800 |
| 2 | Beam 2 | B2 RC | RC | 29.700 | 29.900 | 11.300 | RI | 41.000 | 41.200 | 38.000 | 3.000 | 3.200 |
| 3 | Beam 3 | B3 RB | RB | 29.500 | 29.700 | 12.100 | RL | 41.600 | 41.800 | 38.000 | 3.600 | 3.800 |
| 3 | Beam 3 | B3 RC | RC | 29.700 | 29.900 | 12.100 | RM | 41.800 | 42.000 | 38.000 | 3.800 | 4.000 |
| 4 | Beam 4 | B4 LB | LB | 29.500 | 29.700 | 12.100 | LL | 41.600 | 41.800 | 38.000 | 3.600 | 3.800 |
| 5 | Beam 5L | B5 RB | RB | 29.500 | 29.700 | 11.300 | LH | 40.800 | 41.000 | 38.000 | 2.800 | 3.000 |
| 5 | Beam 5H | B5 RC | RC | 29.700 | 29.900 | 11.300 | LI | 41.000 | 41.200 | 38.000 | 3.000 | 3.200 |
| 6 | Beam 6 | B6 LC | LC | 29.700 | 29.900 | 12.100 | LM | 41.800 | 42.000 | 38.000 | 3.800 | 4.000 |
| 7 | Beam 7 | B7 LA | LA | 29.300 | 29.500 | 11.900 | RJ | 41.200 | 41.400 | 38.000 | 3.200 | 3.400 |
| 8 | Beam 8 | B8 RA | RA | 29.300 | 29.500 | 11.300 | RG | 40.600 | 40.800 | 38.000 | 2.600 | 2.800 |
| 8 | Beam 8 | B8 RB | RB | 29.500 | 29.700 | 11.300 | RH | 40.800 | 41.000 | 38.000 | 2.800 | 3.000 |
| 9 | Beam 9 | B9 LB | LB | 29.500 | 29.700 | 11.900 | RK | 41.400 | 41.600 | 38.000 | 3.400 | 3.600 |
| 10 | Beam 10 | B10 LA | LA | 29.300 | 29.500 | 10.700 | LJ | 41.200 | 41.400 | 38.000 | 3.200 | 3.400 |
| 11 | Beam 11 | B11 LB | LB | 29.500 | 29.700 | 10.700 | RE | 40.200 | 40.400 | 38.000 | 2.200 | 2.400 |
| 11 | Beam 11 | B11 LC | LC | 29.700 | 29.900 | 10.700 | RF | 40.400 | 40.600 | 38.000 | 2.400 | 2.600 |
| 12 | Beam 12 | B12 LB | LB | 29.500 | 29.700 | 11.900 | LK | 41.400 | 41.600 | 38.000 | 3.400 | 3.600 |
| 13 | Beam 13 | B13 RA | RA | 29.300 | 29.500 | 10.700 | RD | 40.000 | 40.200 | 38.000 | 2.000 | 2.200 |
| 14 | Beam 14 | B14 LA | LA | 29.300 | 29.500 | 10.700 | LD | 40.000 | 40.200 | 38.000 | 2.000 | 2.200 |
| 15 | Beam 15 | B15 RB | RB | 29.500 | 29.700 | 10.700 | LE | 40.200 | 40.400 | 38.000 | 2.200 | 2.400 |
| 15 | Beam 15 | B15 RC | RC | 29.700 | 29.900 | 10.700 | LF | 40.400 | 40.600 | 38.000 | 2.400 | 2.600 |

FIG. 5

| IDC | Downlink Band Name | Start Edge Downlink Q-band (GHz) | End Edge Downlink Q-band (GHz) | RFT BDC LO Frequency (GHz) | Start Edge Downlink L-band (GHz) | End Edge Downlink L-band (GHz) |
|---|---|---|---|---|---|---|
| 1 | LD | 40.000 | 40.200 | 38.000 | 2.000 | 2.200 |
|   | LE | 40.200 | 40.400 | 38.000 | 2.200 | 2.400 |
|   | LF | 40.400 | 40.600 | 38.000 | 2.400 | 2.600 |
|   | LG | 40.600 | 40.800 | 38.000 | 2.600 | 2.800 |
|   | LH | 40.800 | 41.000 | 38.000 | 2.800 | 3.000 |
| 2 | LI | 41.000 | 41.200 | 38.000 | 3.000 | 3.200 |
|   | LJ | 41.200 | 41.400 | 38.000 | 3.200 | 3.400 |
|   | LK | 41.400 | 41.600 | 38.000 | 3.400 | 3.600 |
|   | LL | 41.600 | 41.800 | 38.000 | 3.600 | 3.800 |
|   | LM | 41.800 | 42.000 | 38.000 | 3.800 | 4.000 |
| 3 | RD | 40.000 | 40.200 | 38.000 | 2.000 | 2.200 |
|   | RE | 40.200 | 40.400 | 38.000 | 2.200 | 2.400 |
|   | RF | 40.400 | 40.600 | 38.000 | 2.400 | 2.600 |
|   | RG | 40.600 | 40.800 | 38.000 | 2.600 | 2.800 |
|   | RH | 40.800 | 41.000 | 38.000 | 2.800 | 3.000 |
| 4 | RI | 41.000 | 41.200 | 38.000 | 3.000 | 3.200 |
|   | RJ | 41.200 | 41.400 | 38.000 | 3.200 | 3.400 |
|   | RK | 41.400 | 41.600 | 38.000 | 3.400 | 3.600 |
|   | RL | 41.600 | 41.800 | 38.000 | 3.600 | 3.800 |
|   | RM | 41.800 | 42.000 | 38.000 | 3.800 | 4.000 |

| Beam ID | Inroute MHz Carveout Name | Inroute MHz Band Name | Uplink Band Name | Start Edge Uplink Ka-band (GHz) | End Edge Uplink Ka-band (GHz) | Downlink Band Name | Start Edge Downlink Q-band (GHz) | End Edge Downlink Q-band (GHz) | Start Edge Downlink L-band (GHz) | End Edge Downlink L-band (GHz) | Inroute Set Number | IGM | IDC |
|---|---|---|---|---|---|---|---|---|---|---|---|---|---|
| 14 | Beam 14 | B14 LA | LA | 29.300 | 29.500 | LD | 40.000 | 40.200 | 2.000 | 2.200 | 1 | | |
| 15 | Beam 15 | B15 RBC | RBC | 29.500 | 29.900 | LEF | 40.200 | 40.600 | 2.200 | 2.600 | 2 | 1 | |
| 1 | Beam 1 | B1 RA | RA | 29.300 | 29.500 | LG | 40.600 | 40.800 | 2.600 | 2.800 | 3 | | |
| 5 | B5 RB | B5 RB | RB | 29.500 | 29.700 | LH | 40.800 | 41.000 | 2.800 | 3.000 | 4 | | |
| 5 | B5 RC | B5 RC | RC | 29.700 | 29.900 | LI | 41.000 | 41.200 | 3.000 | 3.200 | 5 | | |
| 10 | Beam 10 | B10 LA | LA | 29.300 | 29.500 | LJ | 41.200 | 41.400 | 3.200 | 3.400 | 6 | 2 | |
| 12 | Beam 12 | B12 LB | LB | 29.500 | 29.700 | LK | 41.400 | 41.600 | 3.400 | 3.600 | 7 | | |
| 4 | Beam 4 | B4 LB | LB | 29.500 | 29.700 | LL | 41.600 | 41.800 | 3.600 | 3.800 | 8 | | |
| 6 | Beam 6 | B6 LC | LC | 29.700 | 29.900 | LM | 41.800 | 42.000 | 3.800 | 4.000 | 9 | | |
| 13 | Beam 13 | B13 RA | RA | 29.300 | 29.500 | RD | 40.000 | 40.200 | 2.000 | 2.200 | 10 | | |
| 11 | Beam 11 | B11 LBC | LBC | 29.500 | 29.900 | REF | 40.200 | 40.600 | 2.200 | 2.600 | 11 | 3 | |
| 8 | Beam 8 | B8 RAB | RAB | 29.300 | 29.700 | RGH | 40.600 | 41.000 | 2.600 | 3.000 | 12 | | |
| 2 | Beam 2 | B2 RC | RC | 29.700 | 29.900 | RI | 41.000 | 41.200 | 3.000 | 3.200 | 13 | | |
| 7 | Beam 7 | B7 LA | LA | 29.300 | 29.500 | RJ | 41.200 | 41.400 | 3.200 | 3.400 | 14 | | |
| 9 | Beam 9 | B9 LB | LB | 29.500 | 29.700 | RK | 41.400 | 41.600 | 3.400 | 3.600 | 15 | 4 | |
| 3 | Beam 3 | B3 RBC | RBC | 29.500 | 29.900 | RLM | 41.600 | 42.000 | 3.600 | 4.000 | 16 | | |

| Linear, 256 ksps to 12288 ksps, QPSK+8PSK+16APSK |||||||
|---|---|---|---|---|---|---|
| Bucket Number | SYMCOD | Symbol Rate (ksps) | Modulation | Code Rate | CQI Min (dB) | Current Terminal ||
||||||| Count | Per Cent |
| 1 | 244 | 12288 | 16APSK | 9/10 | 88.05 | 0 | 0.000 |
| 2 | 235 | 8192 | 16APSK | 9/10 | 86.29 | 0 | 0.000 |
| 3 | 242 | 12288 | 16APSK | 4/5 | 85.42 | 0 | 0.000 |
| 4 | 230 | 6144 | 16APSK | 9/10 | 85.04 | 0 | 0.000 |
| 5 | 139 | 12288 | 8PSK | 8/9 | 84.20 | 0 | 0.000 |
| 6 | 233 | 8192 | 16APSK | 4/5 | 83.66 | 0 | 0.000 |
| 7 | 225 | 4096 | 16APSK | 9/10 | 83.28 | 0 | 0.000 |
| 8 | 241 | 12288 | 16APSK | 2/3 | 83.10 | 0 | 0.000 |
| 9 | 134 | 8192 | 8PSK | 8/9 | 82.44 | 0 | 0.000 |
| 10 | 228 | 6144 | 16APSK | 4/5 | 82.41 | 3 | 0.000 |
| 11 | 138 | 12288 | 8PSK | 4/5 | 82.33 | 6596 | 0.660 |
| 12 | 232 | 8192 | 16APSK | 2/3 | 81.34 | 1201 | 0.120 |
| 13 | 129 | 6144 | 8PSK | 8/9 | 81.19 | 270 | 0.027 |
| 14 | 223 | 4096 | 16APSK | 4/5 | 80.65 | 35 | 0.004 |
|  |  |  | ○ ○ ○ |  |  |  |  |
| 22 | 40 | 12288 | QPSK | 9/10 | 79.13 | 400 | 0.040 |
| 23 | 231 | 8192 | 16APSK | 1/2 | 78.65 | 380 | 0.038 |
| 24 | 222 | 4096 | 16APSK | 2/3 | 78.33 | 15 | 0.002 |
| 25 | 132 | 8192 | 8PSK | 2/3 | 78.23 | 76 | 0.008 |
| 26 | 220 | 2048 | 16APSK | 4/5 | 77.64 | 0 | 0.000 |
| 27 | 131 | 12288 | 8PSK | 1/2 | 77.60 | 0 | 0.000 |
| 28 | 123 | 4096 | 8PSK | 4/5 | 77.56 | 3 | 0.000 |
| 29 | 38 | 12288 | QPSK | 4/5 | 77.48 | 382 | 0.038 |

| Linear, 512 ksps to 8192 ksps, QPSK+8PSK |||||||
|---|---|---|---|---|---|---|
| Bucket Number | SYMCOD | Symbol Rate (ksps) | Modulation | Code Rate | CQI Min (dB) | Current Terminal ||
||||||| Count | Per Cent |
| 1 | 134 | 8192 | 8PSK | 8/9 | 82.44 | 0 | 0.000 |
| 2 | 129 | 6144 | 8PSK | 8/9 | 81.19 | 279 | 0.028 |
| 3 | 133 | 8192 | 8PSK | 4/5 | 80.57 | 4 | 0.000 |
| 4 | 124 | 4096 | 8PSK | 8/9 | 79.43 | 0 | 0.000 |
| 5 | 128 | 6144 | 8PSK | 4/5 | 79.32 | 1 | 0.000 |
| 6 | 132 | 8192 | 8PSK | 2/3 | 78.23 | 76 | 0.008 |
| 7 | 123 | 4096 | 8PSK | 4/5 | 77.56 | 2321 | 0.232 |
| 8 | 35 | 8192 | QPSK | 9/10 | 77.37 | 3456 | 0.346 |
| 9 | 127 | 6144 | 8PSK | 2/3 | 76.98 | 1378 | 0.138 |
| 10 | 119 | 2048 | 8PSK | 8/9 | 76.42 | 1408 | 0.141 |
| 11 | 30 | 6144 | QPSK | 9/10 | 76.12 | 0 | 0.000 |
| 12 | 131 | 8192 | 8PSK | 1/2 | 75.84 | 4 | 0.000 |
| 13 | 33 | 8192 | QPSK | 4/5 | 75.72 | 0 | 0.000 |
| 14 | 122 | 4096 | 8PSK | 2/3 | 75.22 | 811 | 0.081 |
| 15 | 126 | 6144 | 8PSK | 1/2 | 74.59 | 11 | 0.001 |
| 16 | 118 | 2048 | 8PSK | 4/5 | 74.55 | 12 | 0.001 |
| 17 | 28 | 6144 | QPSK | 4/5 | 74.47 | 0 | 0.000 |
| 18 | 121 | 4096 | QPSK | 9/10 | 74.36 | 0 | 0.000 |
| 19 | 32 | 8192 | QPSK | 2/3 | 74.08 | 0 | 0.000 |
| 20 | 114 | 1024 | 8PSK | 8/9 | 73.41 | 0 | 0.000 |
| 21 | 27 | 6144 | QPSK | 2/3 | 72.83 | 0 | 0.000 |
| 22 | 121 | 4096 | 8PSK | 1/2 | 72.83 | 0 | 0.000 |
| 23 | 23 | 4096 | QPSK | 4/5 | 72.71 | 0 | 0.000 |
| 24 | 31 | 8192 | QPSK | 1/2 | 72.25 | 0 | 0.000 |
| 25 | 117 | 2048 | 8PSK | 2/3 | 72.21 | 0 | 0.000 |
| 26 | 113 | 1024 | 8PSK | 4/5 | 71.54 | 0 | 0.000 |

CONTINUED FROM FIG.8A

| | | | | | | | | | | | | | |
|---|---|---|---|---|---|---|---|---|---|---|---|---|---|
| 30 | 226 | 6144 | 16APSK | 1/2 | 77.40 | 0 | 0.000 | 27 | 20 | 2048 | QPSK | 9/10 | 71.35 | 102 | 0.010 |
| 31 | 35 | 8192 | QPSK | 9/10 | 77.37 | 10 | 0.001 | 28 | 22 | 4096 | QPSK | 2/3 | 71.07 | 22 | 0.002 |
| 32 | 215 | 1024 | 16APSK | 9/10 | 77.26 | 10 | 0.001 | 29 | 26 | 6144 | QPSK | 1/2 | 71.00 | 0 | 0.000 |
| 33 | 127 | 6144 | 8PSK | 2/3 | 76.98 | 9 | 0.001 | 30 | 110 | 512 | 8PSK | 8/9 | 70.40 | 0 | 0.000 |
| 34 | 119 | 2048 | 8PSK | 8/9 | 76.42 | 11 | 0.001 | 31 | 116 | 2048 | 8PSK | 1/2 | 69.82 | 0 | 0.000 |
| 35 | 30 | 6144 | QPSK | 9/10 | 76.12 | 0 | 0.000 | 32 | 18 | 2048 | QPSK | 4/5 | 69.70 | 0 | 0.000 |
| 36 | 37 | 12288 | QPSK | 2/3 | 75.84 | 176 | 0.018 | 33 | 21 | 4096 | QPSK | 1/2 | 69.24 | 0 | 0.000 |
| 37 | 131 | 8192 | 8PSK | 1/2 | 75.84 | 4 | 0.000 | 34 | 112 | 1024 | 8PSK | 2/3 | 69.20 | 8 | 0.001 |
| 38 | 33 | 8192 | QPSK | 4/5 | 75.72 | 0 | 0.000 | 35 | 108 | 512 | 8PSK | 4/5 | 68.53 | 33 | 0.003 |
| 39 | 221 | 4096 | 16APSK | 1/2 | 75.64 | 0 | 0.000 | 36 | 15 | 1024 | QPSK | 9/10 | 68.34 | 44 | 0.004 |
| 40 | 217 | 2048 | 16APSK | 2/3 | 75.32 | 0 | 0.000 | 37 | 17 | 2048 | QPSK | 2/3 | 68.06 | 0 | 0.000 |
| 41 | 122 | 4096 | 8PSK | 2/3 | 75.22 | 8 | 0.001 | 38 | 111 | 1024 | 8PSK | 1/2 | 66.81 | 0 | 0.000 |
| 42 | 213 | 1024 | 16APSK | 4/5 | 74.63 | 12 | 0.001 | 39 | 13 | 1024 | QPSK | 4/5 | 66.69 | 0 | 0.000 |
| 43 | 126 | 6144 | 8PSK | 1/2 | 74.59 | 370 | 0.037 | 40 | 16 | 2048 | QPSK | 1/2 | 66.23 | 0 | 0.000 |
| 44 | 118 | 2048 | 8PSK | 4/5 | 74.55 | 0 | 0.000 | 41 | 107 | 512 | 8PSK | 2/3 | 66.19 | 0 | 0.000 |
| 45 | 28 | 6144 | QPSK | 4/5 | 74.47 | 0 | 0.000 | 42 | 10 | 512 | QPSK | 9/10 | 65.53 | 0 | 0.000 |
| 46 | 25 | 4096 | QPSK | 9/10 | 74.36 | 2 | 0.000 | 43 | 12 | 1024 | QPSK | 2/3 | 65.05 | 0 | 0.000 |
| 47 | 210 | 512 | 16APSK | 9/10 | 74.25 | 6 | 0.001 | 44 | 106 | 512 | 8PSK | 1/2 | 63.80 | 0 | 0.000 |
| 48 | 32 | 8192 | QPSK | 2/3 | 74.08 | 0 | 0.000 | 45 | 8 | 512 | QPSK | 4/5 | 63.68 | 19 | 0.002 |
| 49 | 36 | 12288 | QPSK | 1/2 | 74.01 | 5 | 0.001 | 46 | 11 | 1024 | QPSK | 1/2 | 63.22 | 0 | 0.000 |
| 50 | 114 | 1024 | 8PSK | 8/9 | 73.41 | 4 | 0.000 | 47 | 7 | 512 | QPSK | 2/3 | 62.04 | 7 | 0.001 |
| | | | ○ ○ ○ | | | | | 48 | 6 | 512 | QPSK | 1/2 | 60.21 | 4 | 0.000 |
| | | | | | | | | 49 | Lower than 512 ksps QPSK Rate 1/2 | | | | 0.00 | 0 | 0.000 |
| | | | | | | | | | | | | Total | | 10000 | 1.000 |
| 94 | 6 | 512 | QPSK | 1/2 | 60.21 | 4 | 0.000 |
| 95 | 2 | 256 | QPSK | 2/3 | 59.03 | 0 | 0.000 |
| 96 | 1 | 256 | QPSK | 1/2 | 57.20 | 0 | 0.000 |
| 97 | Lower than 256 ksps QPSK Rate 1/2 | | | | 0.00 | 0 | 0.000 |
| | | | | | Total | 10000 | 1.000 |

FIG.8B

| Bucket Number | SYMCOD | Symbol Rate (ksps) | Modulation | Code Rate | CQI Min (dB) | Current | | Terminal | |
|---|---|---|---|---|---|---|---|---|---|
| | | | | | | Count | Per Cent | Demand | Per Cent |
| | | | Saturated, 512 ksps to 8192 ksps | | | | | | |
| 1 | 35 | 8192 | OQPSK | 9/10 | 77.37 | 3456 | 0.432 | 3802 | 0.422 |
| 2 | 30 | 6144 | OQPSK | 9/10 | 76.12 | 344 | 0.043 | 275 | 0.031 |
| 3 | 33 | 8192 | OQPSK | 4/5 | 75.72 | 2333 | 0.292 | 2566 | 0.285 |
| 4 | 28 | 6144 | OQPSK | 4/5 | 74.47 | 0 | 0.000 | 0 | 0.000 |
| 5 | 25 | 4096 | OQPSK | 9/10 | 74.36 | 0 | 0.000 | 0 | 0.000 |
| 6 | 32 | 8192 | OQPSK | 2/3 | 74.08 | 122 | 0.015 | 98 | 0.011 |
| 7 | 28 | 6144 | OQPSK | 2/3 | 72.83 | 23 | 0.003 | 25 | 0.003 |
| 8 | 23 | 4096 | OQPSK | 4/5 | 72.71 | 345 | 0.043 | 276 | 0.031 |
| 9 | 31 | 8192 | OQPSK | 1/2 | 72.25 | 0 | 0.000 | 0 | 0.000 |
| 10 | 20 | 2048 | OQPSK | 9/10 | 71.35 | 102 | 0.013 | 333 | 0.037 |
| 11 | 22 | 4096 | OQPSK | 2/3 | 71.07 | 22 | 0.003 | 24 | 0.003 |
| 12 | 26 | 6144 | OQPSK | 1/2 | 71.00 | 0 | 0.000 | 0 | 0.000 |
| 13 | 18 | 2048 | OQPSK | 4/5 | 69.70 | 0 | 0.000 | 0 | 0.000 |
| 14 | 21 | 4096 | OQPSK | 1/2 | 69.24 | 0 | 0.000 | 0 | 0.000 |
| 15 | 15 | 1024 | OQPSK | 9/10 | 68.34 | 44 | 0.006 | 48 | 0.005 |
| 16 | 17 | 2048 | OQPSK | 2/3 | 68.06 | 1006 | 0.126 | 805 | 0.089 |
| 17 | 13 | 1024 | OQPSK | 4/5 | 66.69 | 94 | 0.012 | 103 | 0.011 |
| 18 | 16 | 2048 | OQPSK | 1/2 | 66.23 | 70 | 0.009 | 56 | 0.006 |
| 19 | 10 | 512 | OQPSK | 9/10 | 65.33 | 0 | 0.000 | 0 | 0.000 |
| 20 | 12 | 1024 | OQPSK | 2/3 | 65.05 | 9 | 0.001 | 138 | 0.015 |
| 21 | 8 | 512 | OQPSK | 4/5 | 63.68 | 19 | 0.002 | 432 | 0.048 |
| 22 | 11 | 1024 | OQPSK | 1/2 | 63.22 | 0 | 0.000 | 0 | 0.000 |
| 23 | 7 | 512 | OQPSK | 2/3 | 62.04 | 7 | 0.001 | 8 | 0.001 |
| 24 | 6 | 512 | OQPSK | 1/2 | 60.21 | 4 | 0.001 | 10 | 0.001 |
| 25 | Lower than 512 ksps Rate 1/2 | | | | 0.00 | 0 | 0.000 | 0 | 0.000 |
| | | | | | Total | 8000 | 1.000 | 9000 | 1.000 |

FIG. 9

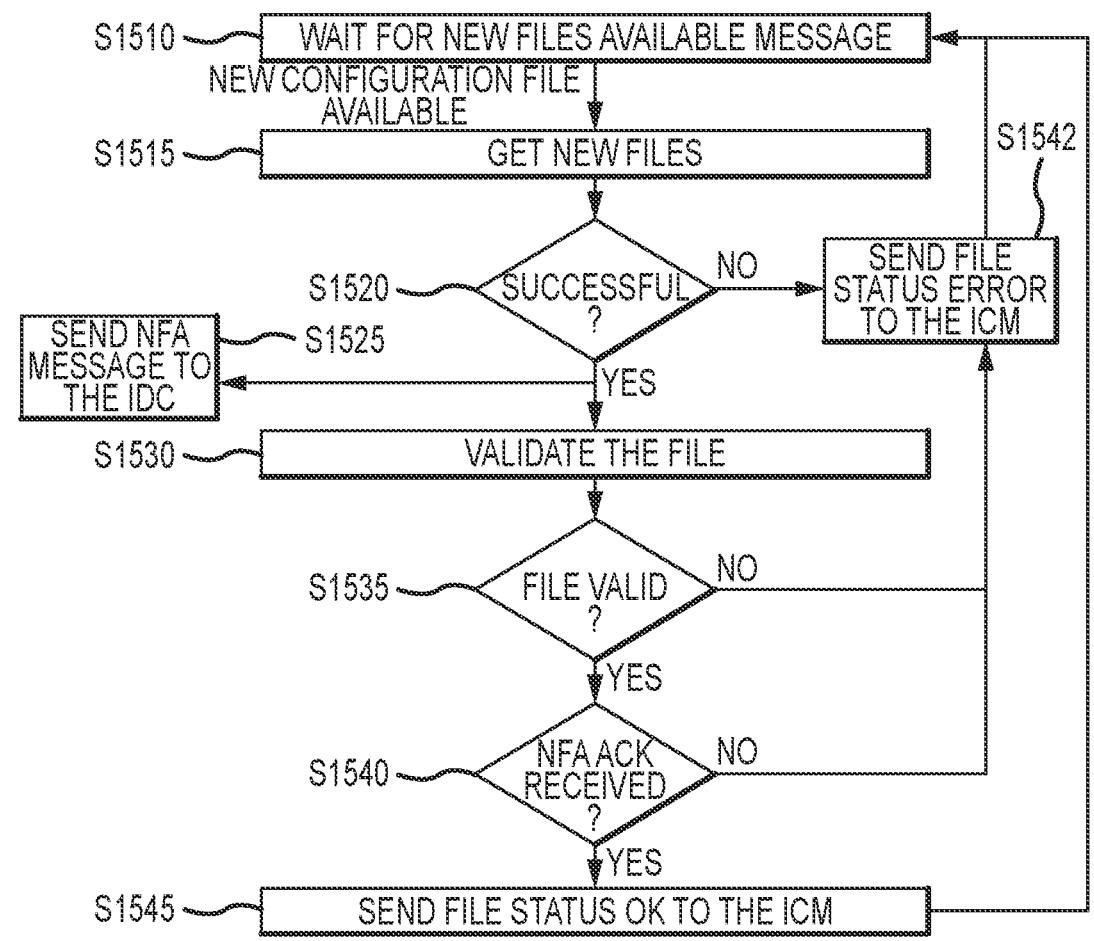
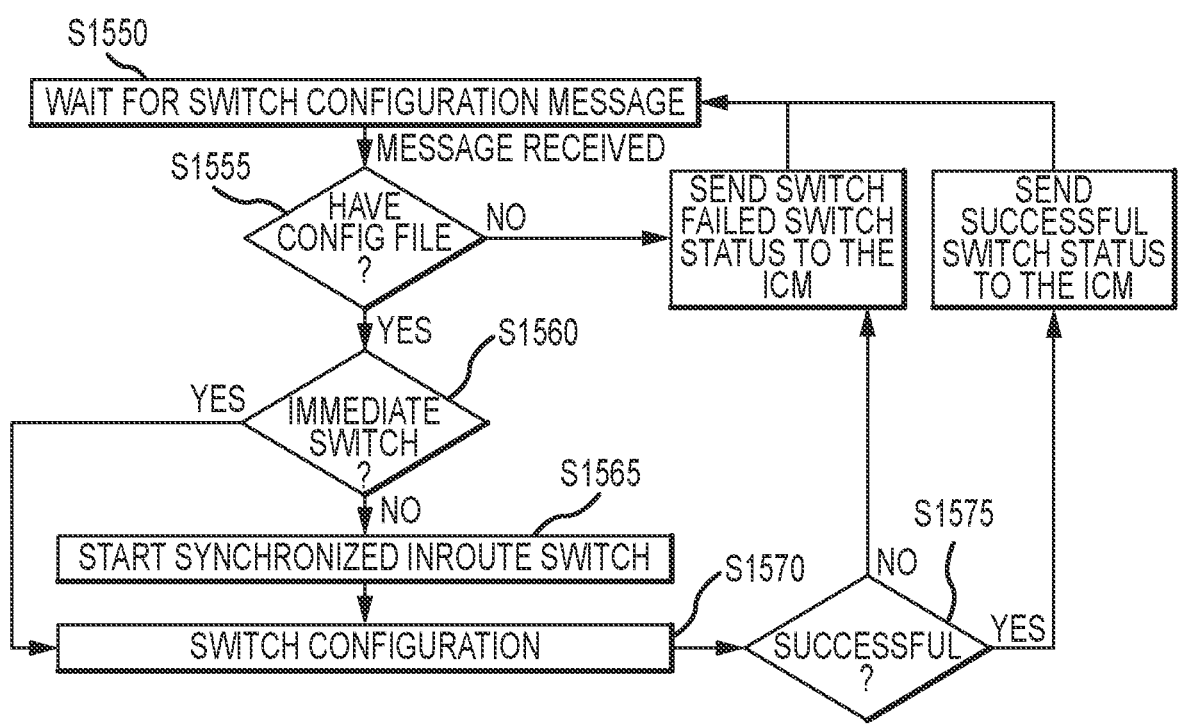
FIG.15

DYNAMIC INROUTE RECONFIGURATION OF SATELLITE NETWORK COMMUNICATION SYSTEMS

CROSS REFERENCE TO RELATED APPLICATION

This application claims the benefit of priority from U.S. Provisional Patent Application Ser. No. 63/133,051 filed Dec. 31, 2020 and entitled "DYNAMIC INROUTE RECONFIGURATION OF SATELLITE NETWORK COMMUNICATION SYSTEMS," which is incorporated by reference herein in its entirety.

TECHNICAL FIELD

Various implementations relate to methods and systems for configuration of satellite terminal in-routes. More particularly, various implementations relate to methods and systems for dynamically reconfiguring in-routes based on demand requirements.

BACKGROUND

Communications sent from a satellite terminal are referred to as "in-route" transmissions, and communications received by a satellite terminal are referred as "out-route" transmissions. An in-route transmission is a transmission that has a specific symbol rate at a specific frequency. A link budget typically determines the expected maximum power available to shared bandwidth terminals, such as satellite terminals, in a beam in clear sky. The expected maximum power available to a satellite terminal is typically used to select higher capacity in-routes that have higher power requirements and provide higher throughputs to maximize both system capacity and terminal data rates. The link budget may also determine the lower capacity in-routes that have lower power requirements and provide lower throughputs needed so that 100% of the satellite terminals in the beam can meet the required annual availability, using rain models to predict the level of, and duration, of rain fades. A rain fade refers to the absorption of a microwave radio frequency (RF) signal by atmospheric rain, snow, or ice, and the losses resulting therefrom. With static in-route configuration, where the number and distribution of the type and number of satellite terminals is static, a trade may have to be made between providing as much high speed in-route capacity as possible and enough low speed capacity to meet the availability requirements. In clear sky, the low speed capacity may be underutilized. In a rain fade, however, it is the high speed capacity that may be underutilized. In either case, if the link budget predictions are inaccurate, the selected higher speed and/or lower speed capacity may not be advantageous. Having static in-route configurations is generally useful, but this requires that there be enough satellite terminals that are not affected by a rain fade to use the high speed capacity. In addition, even when there are enough satellite terminals, the capacity is likely to not be used at its most efficient modulation and code rate combinations.

Adaptive In-route Selection (AIS) and In-route Adaptive Coding and Modulation (IACM) help to improve availability and maximize system performance. However, they may do so within the constraints of a static in-route configuration. If a rain fade happens over a large enough area, higher symbol rate in-routes may be underutilized.

SUMMARY

In light of the above described problems and unmet needs, various implementations provide systems and methods of dynamic in-route reconfiguration.

This Summary identifies example features and aspects and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

In various implementations, methods and systems for dynamic in-route reconfiguration in a shared bandwidth network include receiving at least one of transmit power capability and demand requirements from one or more active network terminals of the shared bandwidth network, determining a resulting in-route configuration during operation of the shared bandwidth network based on the received at least one of transmit power capability and demand requirements, comparing the determined resulting in-route configuration to a current in-route configuration, when the determined resulting in-route configuration is different from the current in-route configuration, establishing the determined resulting in-route configuration as the current in-route configuration and storing the established current in-route configuration in a dynamic in-route reconfiguration manager, and transmitting the established current in-route configuration to the one or more active network terminals. The shared bandwidth network may be a satellite network. The network terminals may be satellite terminals.

Additional advantages and novel features of these various implementations may be set forth in part in the description that follows, and in part may become more apparent to those skilled in the art upon examination of the following or upon learning by practice of the various implementations.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5-9 are tables illustrating frequency band assignments in a communication system, according to various implementations of the instant application;

FIGS. 15 and 16 are flow charts illustrating the new configuration file reception and switching logic, for the IGM and IDC respectively, according to various implementations;

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In various implementations, static in-route configurations present a technical problem, where the number and distribution of the type and number of in-routes is static, which creates a trade-off between providing as much high speed in-route capacity as possible and enough low speed capacity to meet the transmit power capability and demand requirements. In clear sky, the low speed capacity may be underutilized. In a rain fade, however, it is the high speed capacity that may be underutilized.

To address these technical problems and more, in an example, this description provides a technical solution for dynamic in-route reconfiguration in a shared bandwidth network such as, e.g., a satellite network by relying on Dynamic In-route Reconfiguration (DIR). DIR may address the above issues by customizing the in-route speeds based on real-time feedback from the satellite terminals regarding the amount of power they currently have. When the satellite terminals are in clear sky, they typically have enough power available, so DIR creates more high speed in-routes. When some (or all) satellite terminals are in a rain fade, DIR creates enough lower speed in-routes to keep the affected satellite terminals available. In addition, at any given time, DIR may attempt to select a mix of multiple in-route speeds such that a majority of the satellite terminals are able to use the most efficient modulation and code rate combinations for the in-routes created while still meeting service plan throughput requirements.

Various implementations provide advantages which include increasing the overall system in-route capacity by allowing a majority of the satellite terminals to use the most efficient modulation and coding during adverse conditions such as, e.g., rain fade conditions, over time.

Figure 1:
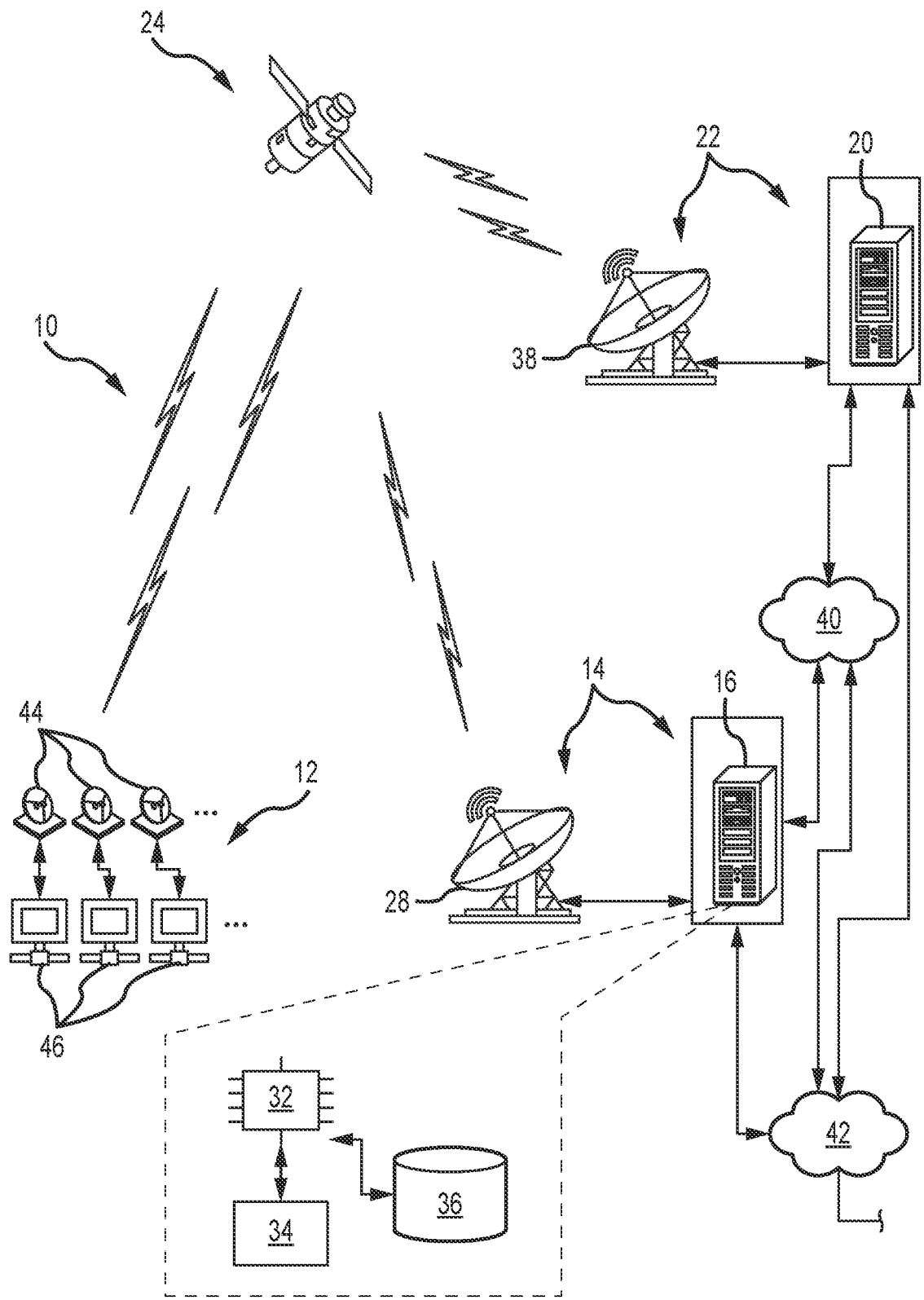
FIG. 1 is a diagram illustrating a satellite network communication system.

FIG. 1 is a diagram illustrating a telecommunication system 10 for improving the transmission efficiency of wireless traffic received from a plurality of wireless terminals 12 over a private communication network 40 and/or a conventional public communication network 42. In general, the telecommunication system such as, e.g., a satellite network communication system 10 includes a satellite gateway 14 having a computer 16 that is programmed to receive in-route data from terminals 12 via in-route channels (which channels were selected by the respective terminals 12), and determines whether to instruct at least some of the satellite terminals 12 to change to a different in-route channel—e.g., to a channel associated with a faster symbol rate or to a channel associated with a slower symbol rate. Conventionally, the satellite terminal 12 exclusively makes this determination; however, the computer 16 may influence channel selection. As described more below, as any given terminal 12 may be unaware of the channels selected by the other terminals 12, the gateway computer 16 may be in a better position to determine whether some channels are heavily trafficked and whether other channels are being underutilized. For example, based on conditions determined by the satellite terminals 12, a number of terminals may be selecting and heavily trafficking a particular symbol rate—e.g., each anticipating that by selecting this particular (higher) symbol rate, the respective terminal 12 may be able to communicate faster (e.g., thereby processing its in-route data and/or backlog volume more rapidly). However, if too many terminals 12 concurrently re-select and begin communicating via this particular higher symbol rate, the available throughput (e.g., across an associated satellite beam) may be consumed resulting in greater individual terminal backlog and an actual overall decrease in throughput. Thus, instead of overall terminal backlog decreasing based on the satellite terminal reselections, backlog increases resulting in, among other things, frustration by terminal users. Herein, a process executable by the gateway computer 16 is described to minimize terminal backlog and balance a traffic load over a set of channels handled by the gateway computer 16.

In the description that follows, the satellite network communication system 10 is described in detail as a satellite system and the satellite terminals 12 are described as satellite terminals (STs); however, this is merely one example to illustrate how a computer (e.g., such as computer 16) which communicatively couples the satellite terminals 12 to a private, public, or other suitable network may be operated. Cellular (e.g., LTE, CDMA, GSM, etc.), short range wireless (e.g., Wi-Fi, Bluetooth, etc.), and other types of telecommunication systems also can be used instead. And for example, the satellite terminals 12 could be stationary and/or portable electronic computing devices comprising one or more of a satellite chipset, a cellular chipset, a short-range wireless chipset, or the like.

Thus, according to the illustrated example, the satellite network communication system 10 may be a so-called bent-pipe satellite system that includes: one or more computers (e.g., such as computer 16) located at each of a plurality of satellite gateways 14 (one gateway is shown for illustrative purposes), one or more similar computers 20 located at a network operations center (NOC) 22, one or more satellites 24 (again, one shown for illustrative purposes), and a plurality of satellite terminals 12 (three are shown for illustrative purposes; however, in practice, thousands or more may be associated with a single satellite gateway 14). A bent-pipe system is one in which the satellite 24 receives a wireless uplink communication from one of the satellite terminals 12 via one of a plurality of channels over a private communication network 40 and/or a conventional public communication network 42, amplifies the communication, performs a frequency shift (to convert the uplink communication to a downlink communication), amplifies the downlink communication, and transmits the downlink communication to the computer 16. Thus, in bent-pipe systems, the satellite 24 may not be programmed to demodulate and/or decode the communication as part of the frequency shift; however, systems other than bent-pipe systems can be used instead. This is merely one example.

In at least some examples, each of the satellite gateways 14 may be identical; therefore, only one may be described. Satellite gateway 14 may perform a variety of functions, including but not limited to: link layer and physical layer out-route coding and modulation, link layer and physical layer in-route handling, in-route bandwidth allocation and load balancing functions, out-route prioritization, web acceleration and HTTP compression, flow control, encryption, redundancy switchovers, traffic restriction policy enforcement, and the like. In at least some examples, the satellite gateway 14 may select suitable symbol rates for terminals 12 in communication therewith (while the respective terminals 12 each may select a suitable (and possibly different) code rate)—thereby optimizing bit efficiency of the network.

Among other things, gateway 14 may include an antenna 28 (e.g., for satellite reception and/or transmission) coupled to at least one computer 16, each such computer comprising one or more processors 32, memory 34, and/or one or more databases 36. Where satellite gateway 14 comprises more than one computer 16, these computers may have similar or identical components, features, and/or characteristics; therefore, only one may be described. Further, in multiple-computer arrangements, one computer may function as a task-manager of slave computers; while the slave computers may carry out one or more dedicated functions, operations, etc. Of course, this also is merely an example, and still other examples exist. For instance, in some gateway examples, at least some of the computers 16 may execute a similar or identical set of programming instructions.

One processor 32 is shown for illustrative purposes only; however, multiple processors 32 could form a portion of computer 16. Processor 32 can be any type of device capable of processing electronic instructions, non-limiting examples including a microprocessor, a microcontroller or controller, an application specific integrated circuit (ASIC), etc. In general, computer 16 may be programmed to execute digitally-stored instructions, which may be stored in memory 34, which enable the processor 32, among other things, to: receive data via a plurality of in-route channels over a private communication network 40 and/or a conventional public communication network 42; identify and group terminals according to their respective channels (e.g., based on the symbol rates of the respective channels); determine to attempt to move a satellite terminal 12 from a first channel to a second channel in order to balance in-route channel traffic, where the first and second channels are associated with different symbol rates; and transmit a command via an out-route channel to the respective terminal based on the determination. This is merely one exemplary set of instructions; other sets of instructions exist which may or may not be executed with this example.

Memory 34 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 34 may store one or more computer program products which may be embodied as software, firmware, or the like.

Database 36 may be any suitable data repositories or other data stores that can include various kinds of mechanisms for storing, accessing, and retrieving various kinds of data, including a hierarchical database, a set of files in a file system, an application database in a proprietary format, a relational database management system (RDBMS), etc. Each such data store can be included within a computer (such as computer 16) employing a computer operating system such as one of the ones mentioned above, and may be accessible via a network in any one or more of a variety of manners. A file system may also be accessible from a computer operating system, and may include files stored in various formats. An RDBMS generally employs the Structured Query Language (SQL) in addition to a language for creating, storing, editing, and executing stored procedures, such as the PL/SQL language mentioned above. These are merely examples; other database examples also can exist.

Network operations center (NOC) 22 may be similar to the satellite gateway 14—e.g., the NOC 22 may comprise an antenna 38 and computer 20 that may be assembled, arranged, connected, etc. in a manner similar to computer 16 of gateway 14. Thus, computer 20 may be programmed to carry out the same instructions with which computer 16 is programmed. However, in at least one example, NOC computer 20 carries out additional instructions as well. For example, computer 20 may comprise management instructions—e.g., executing network management, facilitating software downloads to the satellite terminals, monitoring satellite terminal statuses, executing statistical functions (e.g., associated with satellite terminal data collection, aggregation, reporting, etc.), executing security functions (e.g., including but not limited to key generation, key management and distribution to suitable satellite terminals, etc.), and satellite terminal registration and/or authentication. Furthermore, the NOC 22 may be located at a separate geographical site than one or more of the gateways 14; or in another example, NOC 22 may be co-located with at least one of the gateways 14. Accordingly, computer functions described herein may be carried out by the NOC 22 and/or one or more of the gateways 14.

FIG. 1 also illustrates that the satellite gateways 14 and the NOC 22 may be coupled to one another via a private communication network 40 and/or a conventional public communication network 42. In at least one example, the physical architecture of each of the networks 40 and 42 may be similar or identical; however, the function and use of the networks 40 and 42 may differ in one or more regards. For example, each of networks 40 and 42 may comprise land communication network elements (not shown) which can enable connectivity to a public switched telephone network (PSTN) such as that used to provide hardwired telephony, packet-switched data communications, internet infrastructure, and the like, and/or wireless communication network elements (not shown) which may facilitate cellular telephone communication (e.g., using LTE, CDMA, GSM, etc.)

over wide geographic region(s). The private communication network 40 may function as an intra-net—e.g., facilitating communication only between a plurality of gateways 14 and/or NOC 22, whereas the public communication network 42 may facilitate communication between the satellite network communication system 10 (e.g., the satellite terminals 12, gateways 14, NOC 22, etc.) and other electronic computing devices (e.g., via the internet). Thus, secure communications via the private network 40 may be facilitated using both a physical layer, as well as via encryption and other such suitable techniques. Accordingly, FIG. 1 shows the gateway 14 coupled to the private communication network 40 and the public communication network 42, the NOC 22 coupled to the private communication network 40 and the public communication network 42, the private communication network 40 coupled to the public communication network 42, and the public communication network 42 couplable to other systems, components, computing devices, etc.

Satellite terminals 12 may be any suitable end-user equipment capable of satellite communication—e.g., terminals 12 may include an antenna 44 and a respective computing device 46, as may be appreciated by skilled artisans. For example, while not illustrated, the satellite terminals 12 each may have a communication circuit or satellite chipset enabling wireless communication with satellite 24. Non-limiting examples of satellite terminals 12 include a global positioning system (GPS) device, a satellite telephone, a stationary computer, a mobile satellite transceiver (e.g., for a land, marine, or aircraft vehicle), and the like.

Satellite 24 may be any suitable satellite communication equipment located in earth's orbit—non-limiting examples include: communications satellites, observation satellites, navigation satellites, weather satellites, space telescopes, etc. Non-limiting examples of earth orbits include geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans. Terminals 12 may provide in-route data to satellite 24 via an uplink communication (e.g., over an in-route channel), and in turn, satellite 24 may relay the in-route data to gateway 14 via the same in-route channel. Similarly, gateway 14 may provide out-route data (e.g., a command) to satellite 24 via an uplink communication, and in turn, satellite 24 may relay the out-route data to one or more terminals 12 via a downlink communication. As used herein, in-route data is data sent from a satellite terminal 12 to computer 16 of gateway 14 (and/or computer 20 of NOC 22) via wireless communication using an in-route channel. As used herein, out-route data is data sent from computer 16 (or from computer 20) to a satellite terminal 12 via wireless communication using an out-route channel. As used herein, a channel is a wireless communication link having a predetermined maximum symbol rate (e.g., such as 512 kilo-symbols per second or ksps, 1024 ksps, 2048 ksps, 4096 ksps, 6144 ksps, 8192 ksps, 12,288 ksps). Further, each respective channel may be defined by a modulation and coding scheme (e.g., Phase Shift Keying (PSK), 8-PSK, Quaternary PSK or QPSK, Asymmetric PSK or APSK, Quadrature Amplitude Modulation (QAM), 8-QAM, 16-QAM, 32-QAM) and/or a transmission type (e.g., Time Division Multiple Access (TDMA), Frequency Division Multiple Access, Code Division Multiple Access (CDMA), Scramble Coded Multiple Access (SCMA)). Thus, as used herein, an in-route channel carries in-route data from a satellite terminal 12 to computer 16 (or 20), and as used herein, an out-route channel carries out-route data from the computer 16 (or 20) to the satellite terminal(s) 12.

Figure 2:
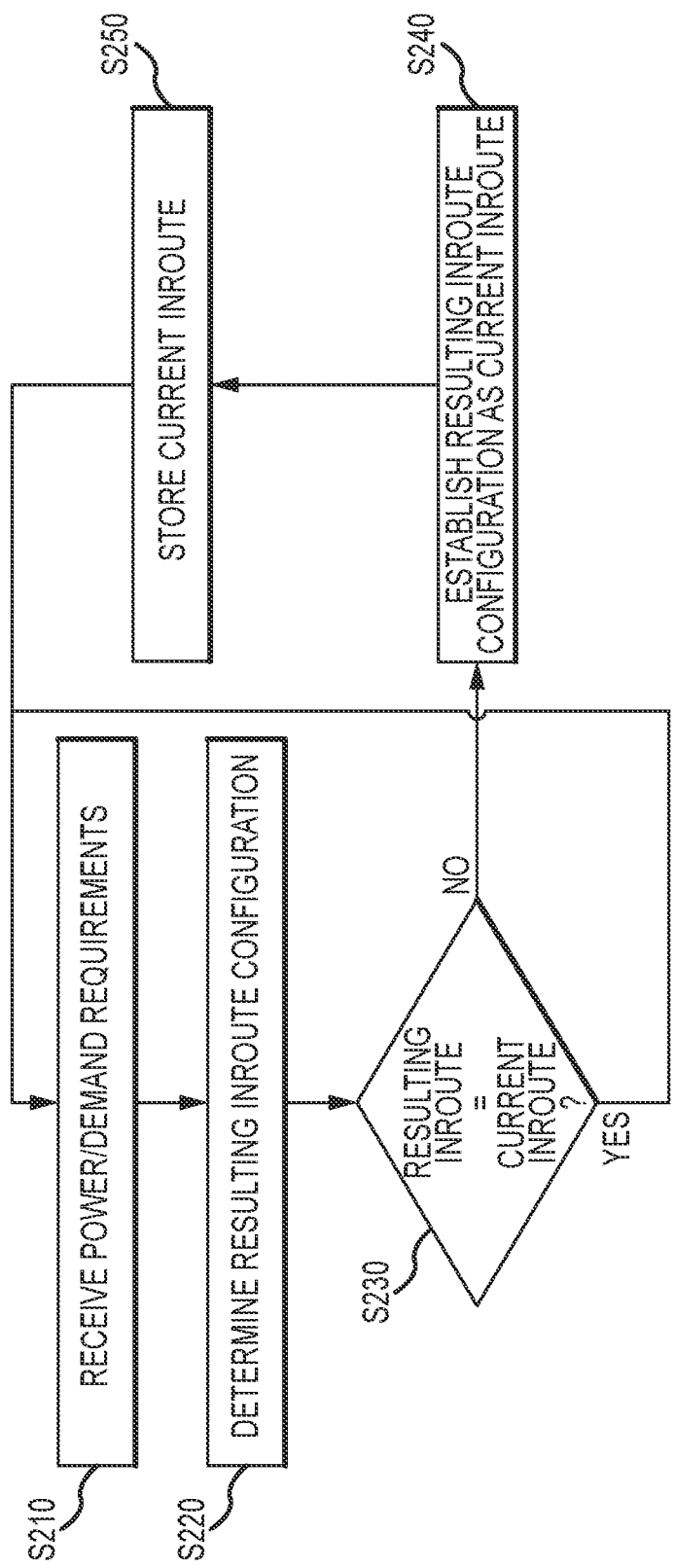
FIG. 2 is a flow chart illustrating a method of dynamic in-route reconfiguration, according to one implementation of the instant application.

FIG. 2 is a flow chart illustrating a method of dynamic in-route reconfiguration, according to various implementations. In various implementations, the method is performed by a shared bandwidth network system such as, e.g., the satellite network communication system 10 illustrated in FIG. 1. The processor 32 may perform one or more of the following steps. At S210, according to various implementations, a processor such as, e.g., processor 32, receives at least one of transmit power capability and demand requirements from one or more of the active network terminals of the satellite network communication system 10 over a private communication network 40 and/or a conventional public communication network 42. In various implementations, receiving the demand requirements includes receiving bandwidth requirements of at least one of the active network terminals of the satellite network communication system 10 over a private communication network 40 and/or a conventional public communication network 42.

In various implementations, at S220, the processor such as, e.g., processor 32, determines a resulting in-route configuration. Determining the resulting in-route configuration may include exchanging in-route configuration with a process manager such as, e.g., NOC 22. Exchanging in-route configuration may include collecting terminal power feedback from the process manager such as, e.g., NOC 22. Determining the resulting in-route configuration includes determining whether the process manager such as, e.g., NOC 22, or one or more of the active network terminals are ready to update the current in-route configuration. Determining the resulting in-route configuration also includes determining that the determined resulting in-route configuration is in a valid file format, determining that the one or more active network terminals are ready to accept the determined resulting in-route configuration, exchanging a switch command with the process manager such as, e.g., NOC 22, the switch command including instructions to replace the current in-route configuration with the determined resulting in-route configuration, and confirming completion of the switch command by the process manager such as, e.g., NOC 22.

In various implementations, determining the in-route configuration includes configuring in-routes at startup of the shared bandwidth network such as, e.g., the network communication system 10, and dynamically adjusting the configured in-routes based on the received transmit power capability and demand requirements. The transmit power capability and demand requirements may be received from the satellite terminals. The transmit power capability and demand requirements may include a maximum power available to the active network terminals in a beam. Receiving the transmit power capability requirements from the satellite terminals includes receiving a distribution of bandwidths from the process manager such as, e.g., NOC 22, assigned to various functions of the shared bandwidth network such as, e.g., the network communication system 10. Receiving the distribution of bandwidths from the process manager such as, e.g., NOC 22, includes receiving a distribution of low-speed bandwidth requirements such as, e.g., requirements for downloading files or videos from the internet or using video streaming services, and high-speed bandwidth requirements such as, e.g., performing video conferencing, among the active network terminals of the satellite network communication system 10.

In various implementations, determining the resulting in-route configuration includes mapping a plurality of bandwidths to the active network terminals of the satellite network communication system 10 and/or allocating bandwidths to the active network terminals of the satellite network communication system 10. Allocating bandwidths may include combining bandwidths on a same satellite link.

At S230, in various implementations, the processor such as, e.g., processor 32, determines whether the determined resulting in-route configuration is the same or similar to the current in-route configuration. If the determined resulting in-route configuration is the same or similar to the current in-route configuration, the method continues to S210, where the processor 32 receives at least one of transmit power capability and demand requirements from one or more of the satellite gateways 14. If the method at S230 determines that the determined resulting in-route configuration is different from the current in-route configuration, then the method goes to S240.

In various implementations, at S240, the processor 32 establishes the determined resulting in-route configuration as the new current configuration. At S250, the system such as, e.g., the satellite network communication system 10, stores the new current in-route configuration in a data repository such as, e.g., memory 34 illustrated in FIG. 1.

Figure 3:
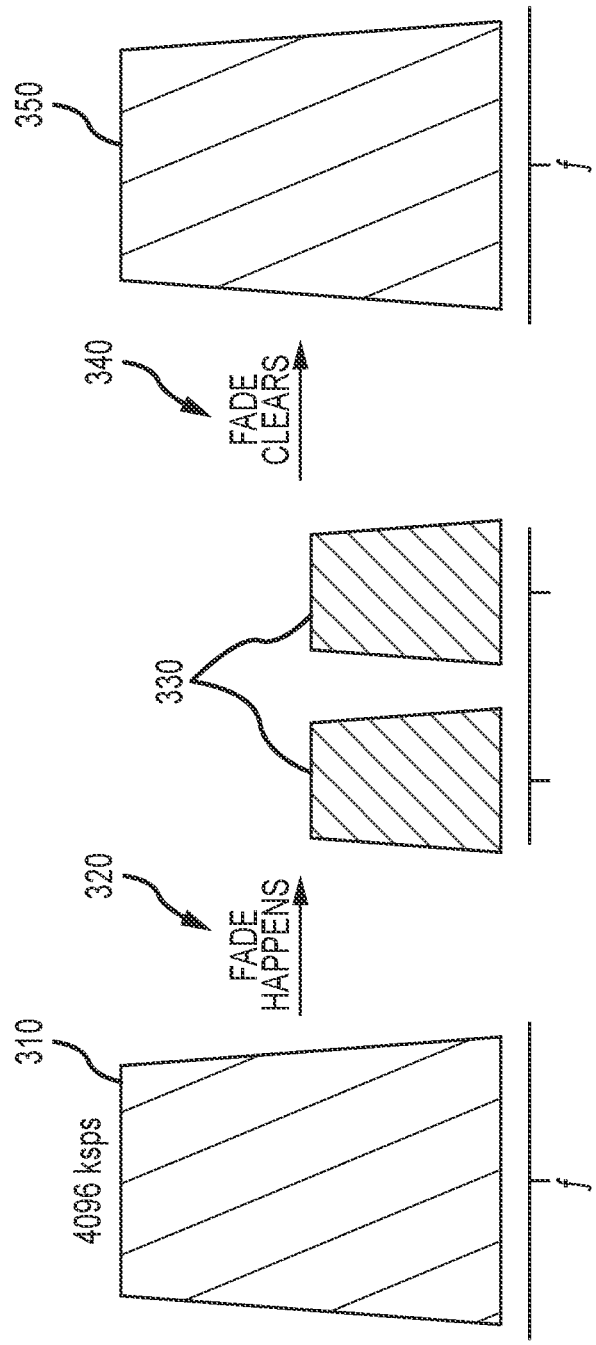
FIG. 3 is a diagram illustrating a method of dynamic in-route reconfiguration, according to one implementation of the instant application.

FIG. 3 is a diagram illustrating a method of dynamic in-route reconfiguration, according to various implementations. To increase both the availability and the system capacity, the in-route configuration may have to dynamically adapt to current terminal requirements. This is the function of the DIR feature. Based on input received from the satellite terminals as to how much power headroom the satellite terminals currently have, the DIR feature dynamically adjusts up or down the mix of in-route symbol rates being used in a given satellite beam as illustrated in FIG. 3. When more power is available, e.g., 4096 ksps in in-route 310, larger and/or faster in-routes can be used. In various implementations, when a rain fade 320 occurs, and less power is available, e.g., 2048 ksps, smaller, more efficient (with respect to bits per symbol for a given available transmit power) in-routes 330 can be used. The power headroom information indicates the current fade conditions for the beam. When the rain fade 340 clears, the higher power in-route 350 is selected again. In some implementations, every terminal, or most of the terminals transmit at the maximum modulation and code rate in use all or most of the time. Adjustments in in-route configuration mix may happen in near real-time without operator intervention.

In various implementations, to support near real-time in-route configuration, the DIR feature in the processor 32 may provide in-route configuration to the In-route Group Managers (IGMs) and In-route Demodulator Controllers (IDCs). In implementations, the IGM is configured to, e.g., report available channels to the satellite terminals, and allocate bandwidth to the satellite terminals on the reported available channels. The IDCs may be configured to control demodulation and check for errors in the bursts of the reported available channels. The IGMs may be hosted on the computer 16 of gateway 14 or the computer 20 of NOC 22 illustrated in FIG. 1. The IDCs may be hosted on the computer 16 of gateway 14 illustrated in FIG. 1. Since obtaining in-route configuration from two sources may not be desirable, the DIR feature takes over the responsibility from the Network Management System (NMS) for configuring in-routes. This is known as Delegated In-route Configuration (DIC). When in-route configuration is delegated, the NMS configures the DIR feature with information about the available in-route spectrum as well as parameters to guide the DIR algorithm. The NMS provides to the IGMs and IDCs profile information for characteristics of the in-routes which are common across many in-routes. In addition, the NMS is responsible for creating In-route Sets and In-route Groups into which dynamically created in-routes may be placed. For example, an In-route Group is a set of in-routes of the same symbol rate that are treated together by the bandwidth manager, and an In-route Set is a set of in-route groups within a beam that are treated together by the bandwidth manager.

In various implementations, in-route configuration is provided to the IGMs and IDCs by a new system component, the In-route Configuration Manager (ICM), i.e., the NMS delegates in-route configuration to the ICM. When in-route configuration is delegated to the ICM, the ICM is then able to dynamically change the in-route configuration.

In various implementations, part of the IGM handling of a new in-route layout is the moving of terminals off in-routes which are going to be removed. The satellite terminals which may be moved may be placed on existing in-routes which are not being removed, or which are not on the new in-routes being created. Identifying which terminals are impacted may include identifying a list of terminals currently assigned to use the in-routes which are disappearing.

In various implementations, in order to determine where to move the satellite terminals during reconfiguration, one approach may be to move the satellite terminals to the newly created in-routes that replace the in-routes being removed. The two sets of in-routes, the ones being removed, and the ones being added, may be equivalent in terms of total symbol rate (ksps). However, even if the two in-routes are equivalent, it is possible that the new in-routes may not properly accommodate the requirements of the moving terminals. For example, when smaller in-routes are consolidated into a larger in-route, the larger in-route may have higher transmission power requirements. Also, terminals which could use the smaller in-routes may not have enough power headroom to use the larger in-route. In addition, when a larger in-route is split into smaller in-routes, as illustrated in FIG. 3, a satellite terminal may be running on the larger in-route because it has a large, guaranteed bandwidth requirement. Accordingly, it may not be possible to provide the throughput rate (mbps) required by the satellite terminal on the smaller in-route.

In various implementations, the IGM, located at, for example, one of the computers 20 illustrated in FIG. 1, may use the logic relied on for newly arrived terminals to select an In-route Group and in-route for the satellite terminals. This may allow for a direct move of each terminal to an appropriate In-route Group based on a current state thereof, e.g., its current channel quality indicator (CQI) value, which expresses the terminal's current power as a number, and its current backlog or committed bandwidth rate (CBR)/committed information rate (CIR) bandwidth requirements. Terminals which end up on In-route Groups with newly added in-routes may fill in those in-routes.

Figure 4:
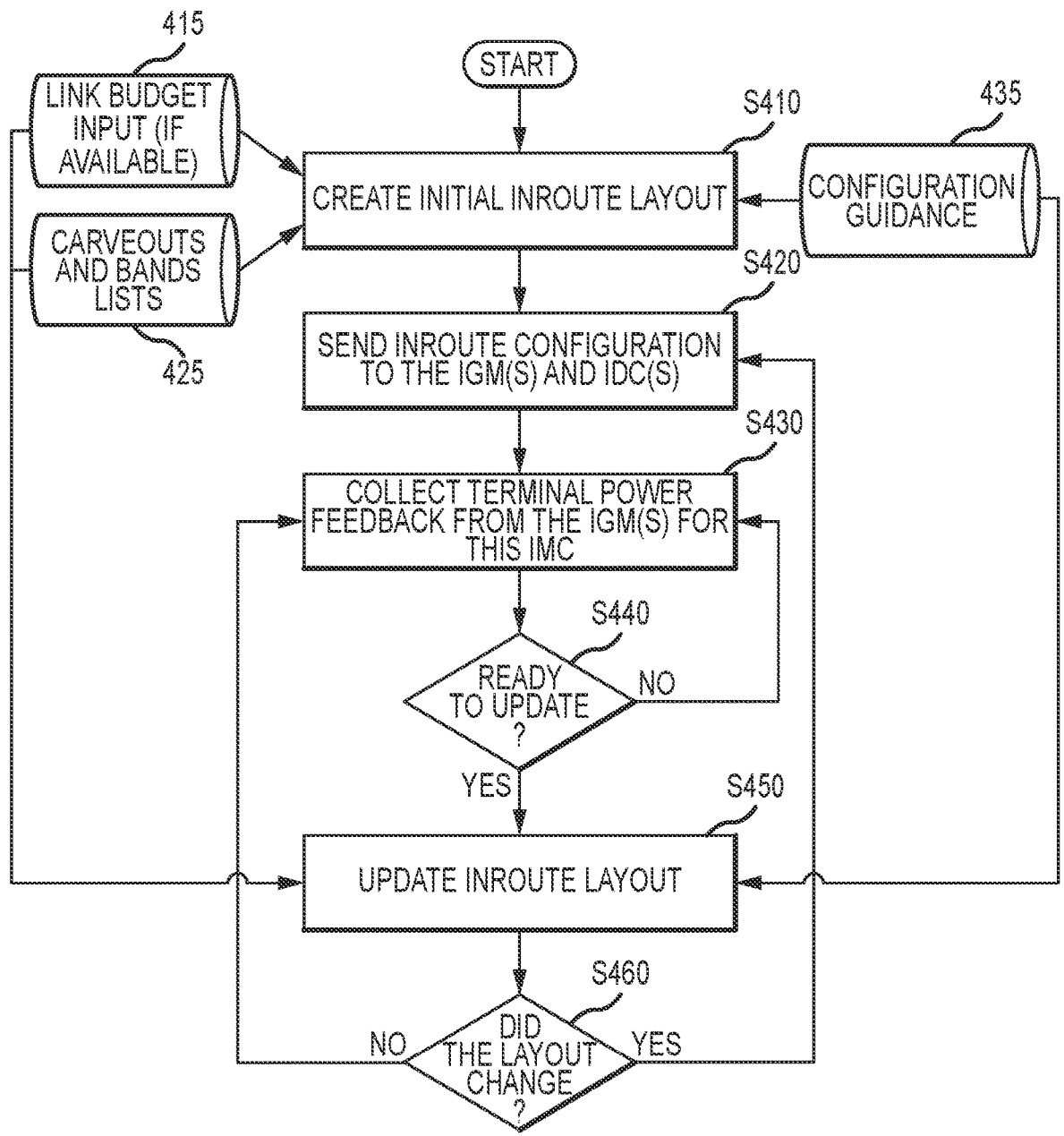
FIG. 4 is a flow chart illustrating a method of dynamic in-route reconfiguration, according to one implementation of the instant applications.

FIG. 4 is a flow chart illustrating a method of dynamic in-route reconfiguration, according to various implementations, implemented by a processor such as, e.g., processor 32 illustrated in FIG. 1. The method starts at S410, where an initial in-route layout is created by, e.g., the computer 16 of gateway 14 (and/or computer 20 of NOC 22) in the satellite network communication system 10 illustrated in FIG. 1. In various implementations, the ICM at, for example, a computer 16 of gateway 14 (and/or computer 20 of NOC 22) illustrated in FIG. 1, creates the in-route configuration, thus automating the process of generating in-route recommended configuration. The ICM may use link budget information 415, which includes expected power requirements from the satellite terminals 12, to configure in-routes at startup, and may use carve-outs, bands lists 425 and configuration guidance 435. Band Lists are the available frequency bands within which in-routes may be dynamically created. Carveouts are cases where the frequency bands may be split into more than one section (e.g., for multiple large service providers or use types). Accordingly, in-routes are dynamically created in each carveout. Accordingly, the DIR algorithm may move an In-route Frequency (or MHz) Carveout (IMC) dynamically as a function of conditions such as demand and power. At a high level, the ICM may increase or maximize instantaneous terminal throughput and in-route efficiency by selecting a mix of in-route symbol rates.

In various implementations, as discussed above, the ICM creates an initial in-route layout at S410 based on the link budget input 415 and the carve-outs and bands lists 425. The initial in-route layout may be created based on expected maximum power available to the satellite terminals 12 of the satellite network 10 illustrated in FIG. 1.

In various implementations, at S420, the ICM may send in-route configuration to the IGMs and IDCs. The ICM at, e.g., computer 16 of gateway 14 (and/or computer 20 of NOC 22), determines a resulting in-route configuration, and sends the in-route configuration to the IGMs and IDCs via the private communication network 40 and/or a conventional public communication network 42.

In various implementations, at S430, the ICM collects terminal power and demand feedback from the IGMs for the IMC. At S440, the ICM, hosted at, e.g., computer 16 of gateway 14 (and/or computer 20 of NOC 22), determines whether the in-route is ready to be updated. If at S440 the ICM determines that the in-route is not ready to be updated, then the ICM continues to S430 and continues to collect terminal power feedback from the IGMs at the satellite gateways 14. If at S440 the ICM determines that the in-route is ready to be updated, then the ICM at S450 may update the in-route layout with the new in-route configuration obtained at S420. In various implementations, the ICM at S450 updates the in-route layout based on the dynamic terminal power and demand information, and the link budget input 415, the carveouts, bands lists 425 and configuration guidance 435 may set limits or guidelines for the dynamic in-route reconfiguration. At S460, the ICM determines whether the layout has changed. If the ICM determines at S460 that the layout has changed, then the ICM continues to S420 and may send the in-route configuration to the IGMs and the IDCs. If the ICM determines at S460 that the layout has not changed, then the ICM continues to S430 and collects terminal power feedback from the IGMs.

The following provides a description of the carveouts and bands lists used to configure in-route layouts. For convenience, satellite bands such as Ka-band, Q-band and V-band spectrum has traditionally been divided into smaller, named sub-bands. Generally, these sub-bands are merely referred to as bands. A band is defined as a range of contiguous spectrum, a polarity, a traffic direction and a spacelink direction. The polarity, traffic direction and spacelink direction combinations are summarized in Table 1 below.

TABLE 1

Polarity and Direction Combinations

| Polarity | Traffic Direction | Spacelink Direction |
| --- | --- | --- |
| Left Hand Circular (LHCP) | Forward (Gateway to Terminal) | Uplink (to Satellite) Downlink (from Satellite) |
|  | Return (Terminal to Gateway) | Uplink Downlink |
| Right Hand Circular (RHCP) | Forward | Uplink Downlink |
|  | Return | Uplink Downlink |

Table 1 describes the traffic direction and spacelink direction with respect to the polarity of the bands. LHCP describes the polarization of an electromagnetic wave in which the electric field vector rotates in a counterclockwise direction, as seen by an observer looking in the direction of propagation of the wave. RHCP describes the polarization of the electromagnetic wave in which the electric field vector rotates in a clockwise direction, as seen by an observer looking in the direction of propagation of the wave. For each polarity, the traffic is either forward, i.e., from the satellite gateway 14 to the terminal 12, as illustrated in FIG. 1, or return, i.e., form the terminal 12 to the satellite gateway 14. The spacelink direction is either an uplink direction, i.e., from the satellite gateway 14 to the satellite 24, as illustrated in FIG. 1, or a downlink direction, i.e., from the satellite 24 to the satellite gateway 14.

In a particular traffic direction, the satellite, such as the satellite network communication system 10 illustrated in FIG. 1, uses a local oscillator (LO) to translate between the uplink frequency (e.g., in Ka-band) and the downlink frequency (e.g., in Q-band). The satellite's LO frequency is added to the Ka-band frequency to translate it to Q-band. There may be multiple satellite local oscillators in order to support frequency reuse. In various implementations, the satellite may create a beam specific map of uplink bands to downlink bands.

FIGS. 5-9 are tables illustrating frequency band assignments in a communication system, according to various implementations. It may be noted that some beams (e.g., Beam 3 and Beam 15) are assigned more than one band. The first letter of the band name indicates the polarity, "L" or "R", of the band. FIGS. 5-9 also show how the uplink bands and downlink bands are mapped to each other by the satellite. The mapped return pair is referred to as an In-route MHz Band (IMB). An IMC is defined to be a set of In-route MHz Bands that are to be treated as a single bandwidth pool for in-route configuration. Usually there is one IMC per beam. However, there may be reasons to divide the bandwidth of a beam into multiple IMCs. The set of IMBs assigned to an IMC may not be contiguous. In some implementations, there is a single IMC per beam. However, in some cases there may be a need to "carve out" dedicated spectrum for some special purpose. Example reasons for such carveouts may include, alone or in combination:

Creating in-routes dedicated for use by a single Virtual Network Operator (VNO) may involve separating in-routes for terminals which have different, non-compatible characteristics from each other. For example, to create separate sets of saturated versus linear in-routes, an implementation may involve mapping different satellite bands in the same beam to different demodulators, especially if those demodulations are in different gateways.

Creating multiple In-route MHz Carveouts in a beam (for reasons other than the use of different IDCs) may involve sub-dividing an In-route MHz Band within a beam into two IMBs so that parts of it can be assigned to different IMCs and assigning separate In-route MHz Bands within the same beam to different IMCs.

Determining which method to use depends partially on the band layout in the beam and partially on the amount of bandwidth that needs to be assigned to different roles. For example, for Beam 1, its single In-route MHz Band may be divided into separate IMBs for use by saturated versus linear in-routes carveouts. For Beam 8, the two bands of the beam may simply be assigned to different carveouts. Beam 3 illustrates combining the two approaches. One band is divided in order to assign some bandwidth for saturated in-routes. However, the other band is dedicated to linear in-routes.

As discussed earlier, band names are generally satellite specific and are generally used as convenient references for discussion. The bands may be defined by their characteristics, especially their frequency ranges. The amount of configuration required can be reduced by consolidating adjacent bands which are in the same In-route MHz Carveout. For example, looking at Beam 15 in FIGS. 5-9, the two bands can be combined together into a single larger band. In various implementations, merely because two bands are adjacent does not mean that they can be combined. For example, the two bands of Beam 5 are adjacent, but they are supported by different IDCs and thus may not be combined. That is because two (or more) adjacent bands can usually only be combined if they are supported by the same hardware. For example, an in-route in Beam 15 centered on frequency 29.7 GHz is entirely received by the same IDM. An in-route in Beam 5 centered or (or even too near) the same frequency, 29.7 GHz, is partially received by one IDM and partially received by another IDM which may not be a desirable configuration. This may be referred to below as a hardware rule.

In example implementation, the above hardware rule may not only apply to the demodulator hardware, but also to any hardware in the path from the satellite. In addition, the above hardware rule may apply to the satellite itself. In various implementations, it may be unlikely that path boundaries in the RFT may not align with In-route Demodulator (IDM) boundaries, because this may be wasteful. However, this may not be the case for satellites. With older "analog" satellites, bands which were adjacent but on different hardware (e.g., transponders) may have filter stay-outs and, thus, may not actually be configured as contiguous. However, with the introduction of newer digital satellites, especially reconfigurable satellites, this may or may not be the case. For example, with a digital satellite, even though two downlink bands may be adjacent, their corresponding uplink bands may not be adjacent. Thus, the ICM requires input as to when it can and cannot straddle satellite band boundaries. In the specific case of Beams 15 and 5 cited in the above examples, the ICM may make such a determination based on the fact that the same IDM is involved in Beam 15, but two IDMs are involved for Beam 5. But this does not provide input as to any satellite constraints. Band consolidation may be used not merely to reduce the amount of configuration but also to let the ICM know where the boundaries are that cannot be crossed. If the ICM is allowed to place in-routes across the satellite band boundary, the boundary is hidden from the ICM via combining the adjacent bands into a larger band. The ICM typically presumes that any provided band boundary may not be crossed.

FIG. 7 illustrates frequency band assignments with IGMs and IDCs in a communication system, according to various implementations of the instant application. In order to actually configure in-routes, the ICM may require the mapping of In-route MHz Carveouts to In-route MHz Bands and In-route MHz Bands to IDCs. It may also require knowing which IGM is associated with each IDC. The mapping of IDCs to In-route MHz Bands is system specific. FIG. 6 illustrates the mapping according to various implementations. As illustrated in FIG. 6, each Gateway supports 4 GHz of return bandwidth. In this case, an IDM supports 1 GHz of contiguous bandwidth and as such four (4) IDCs may be required. A one to one mapping of IGM to IDC exists so there may also be four (4) IGMs. The above may be true independent of which bands are assigned to which beams in the Gateway. Beam specific mapping comes into play when looking at the bands from the IGM and terminal viewpoints. Even though the two In-route MHz Bands of Beam 5 are adjacent, Beam 5's bands map to different IDCs. Thus, the previously discussed simplification of having different IMCs may apply.

In various implementations, because of the way the uplink and downlink bands are mapped by the satellite 24, each IGM may have two IMCs which are using the same in-route frequencies. For example, Beam 8 and Beam 13 are mapped to the same IDC and, hence, the same IGM, and both use band RA in the return uplink. This does not violate the hardware rule because the bands for the two beams are different on the downlink side (RG versus RD).

In various implementations, for Dynamic In-route Reconfiguration purposes, the ICMs may have IGMs periodically provide a summary of the CQI distribution of the currently active terminals for each In-route Set as input to the dynamic reconfiguration algorithm. For example, the list of minimum CQI values is used to define a set of buckets for purposes of counting where a satellite terminal is in bucket N if:

$$CQI\ Min_{N+1} > CQI_{Terminal} >= CQI\ Min_N$$

The actual CQI minimum threshold values are system specific, but the relative ordering may be relevant for defining buckets. In various implementations, the number and size of buckets depends on the set of In-route Group Types being supported. For example, for a system using only saturated in-routes, buckets may be limited to those needed for OQPSK. For a system using linear in-routes, the number of buckets depends on the modulations in use, e.g., QPSK plus 8PSK versus QPSK plus 8PSK plus 16APSK, and the number of symbol rates being used.

FIG. 8 illustrates two CQI distributions provided by IGMs to ICMs for a system with linear in-routes. The satellite terminal count numbers in the examples are for example purposes only. The table on the left includes all symbol rates and modulations that are supported by the system. The table on the right is limited to 512 ksps to 8192 ksps and QPSK plus 8PSK. The buckets are numbered from highest SYMCOD (Symbol rate and Coding) to lowest SYMCOD with respect to the CQI values which apply in the particular system. For example, an in-route is a given symbol rate, and a terminal can select the modulation (QPSK, 8SPK, and the like) and the coding (½, ⁹⁄₁₀, etc.) to use for its burst in its assigned bandwidth allocation on that in-route.

In various implementations, in addition to the power information, the ICM also receives the accumulated demand of the satellite terminals in each CQI bucket. This is illustrated in FIG. 9, which is a saturated in-routes table limited to 512 ksps to 8192 ksps. (again, the satellite terminal count and demand numbers are completely fictitious.) The demand may be provided as Mbps and may be used to weigh the count input, i.e., to consider the bandwidth needs of the currently active terminals. How the demand is calculated for each terminal depends upon the service plan guarantee configuration of the satellite terminal. In an implementation, the demand for an Adaptive Constant Bit Rate (ACBR) terminal may be equal to its guaranteed rate.

Demand=Guaranteed Rate

In various implementations, the demand for a CIR terminal is equal to its guaranteed rate plus the amount of traffic it is currently using between its CIR and PIR. The latter is known as the backlog rate since it is driven by backlog reported by the satellite terminal. For example, if the committed information rate (CIR) is 2 Mbps and the peak information rate (PIR) is 4 Mbps, fora satellite terminal using 1 Mbps, the demand is 2 Mbps. However, if the satellite terminal is using 3 Mbps (2 Mbps guaranteed plus 1 Mbps of backlog), then the satellite demand is 3 Mbps. The demand may not be greater than the PIR.

Demand=Guaranteed Rate+MIN (Backlog Rate, Peak Rate−Guaranteed Rate)

plan, may be adjusted before doing the demand calculation by any applicable API throttle rate or IBM provided per VNO throttle rate. Per terminal demand is tracked continuously by the IGM with values of the satellite terminals in each CQI bucket added together to report to the ICM.

The example method of determining how many of which types of in-routes to configure at a given time may include taking the satellite terminal power and the demand distribution, and calculating the most efficient in-route combination which still meets terminal service plan requirements. The former drives symbol rates down in order to drive modulations up. The latter stops the system from merely running with the highest SYMCOD of the lowest symbol rate.

In various implementations, Table 2 below summarizes the DIR-specific messages sent between the ICM and the IGM. Table 3 below summarizes the DIR-specific messages sent between the ICM and IDC. Table 4 below summarizes the DIR-specific messages sent between the IGM and the IDC. Each of the messages may have a sequence number (not shown) that allows for matching ACKs to the messages which elicit them. The messages are described in the following subsections.

TABLE 2

ICM to/from IGM Messages

| ICM/IGM Messages | | Sender | Receiver | Parameters |
|---|---|---|---|---|
| Heartbeat | HB | ICM | IGM | IGM AV, IGM IV, IDC AV, IDC IV, CQI Needed Flag |
| Heartbeat Response | HR | IGM | ICM | IGM AV, IGM IV, IDC AV, IDC IV, UIP Flag |
| New File(s) Available | NFA | ICM | IGM | IGM NV, IDC NV |
| File Status | FS | IGM | ICM | IGM NV, IDC NV, IGM File Status, IDC File Status |
| Switch Configuration | SC | ICM | IGM | IGM NV, Frame Number |
| Switch Status | SS | IGM | ICM | IGM AV, Switch Status, Frame Number |
| CQI Input | CQII | IGM | ICM | IS ID, CQI Table |
| Acknowledgement | ACK | Either | Either | None |

TABLE 3

ICM to/from IDC Messages

| ICM/IDC Messages | | Sender | Receiver | Parameters |
|---|---|---|---|---|
| Heartbeat | HB | ICM | IDC | IDC AC, IDC IV, AV on IGM Flag, IV on IGM Flag |
| Heartbeat Response | HR | IDC | ICM | IDC AC, IDC IV, UIP Flag |
| File Status | FS | IDC | ICM | IDC NV, File Status |
| Switch Configuration | SC | ICM | IDC | IDC NV, Frame Number |
| Switch Status | SS | IDC | ICM | IDC AV, Switch Status, Frame Number |
| Acknowledgement | ACK | Either | Either | None |

In various implementations, the demand for a Best Effort terminal may be calculated the same way as for a CIR terminal where the guaranteed rate is 0 and the PIR is equal to the plan rate.

Demand=MIN (Backlog Rate, Plan Rate)

In various implementations, determining the backlog rate (for both CIR and Best Effort) may include determining the rate it may take to empty the current backlog over some time interval. A default time interval is 12 frames.

Backlog Rate=Backlog (in bits)/(12*45)

In various implementations, all of the configured rates, ACBR guarantee, CIR guarantee, CIR peak and BE service

TABLE 4

IGM to/from IDC Messages

| IGM/IDC Messages | | Sender | Receiver | Parameters |
|---|---|---|---|---|
| New File Available | NFA | IGM | IDC | IDC NV |
| Acknowledgement | ACK | IDC | IGM | None |

Figure 10:
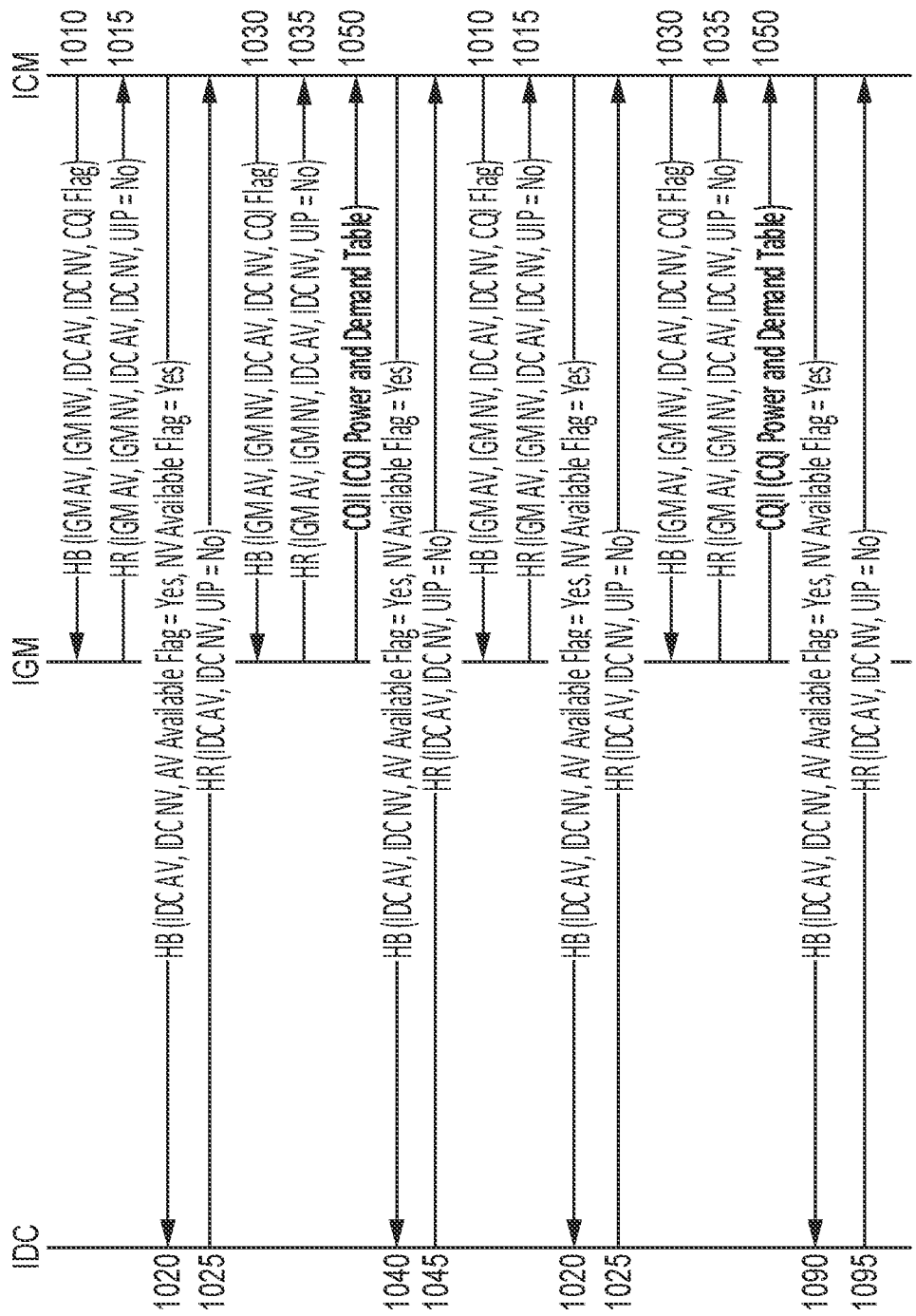
FIG. 10 is a diagram illustrating heartbeat exchanges, according to various implementations of the instant application.

FIG. 10 is a diagram illustrating heartbeat exchanges, according to various implementations. In various implementations, a heartbeat (HB) message is a periodic signal generated by hardware or software to indicate normal operation or to synchronize other parts of a computer system, in this case of the satellite communication system. The HB messages may be sent periodically (e.g., once a second) to each IGM and IDC, e.g., hosted at the computer 16 of gateway 14 (and/or computer 20 of NOC 22) illustrated in FIG. 1, from the ICM hosted at, e.g., the computer 16 of gateway 14 (and/or computer 20 of NOC 22). The HB message sent to the IGM may include the active and inactive configuration file versions for both the IGM and the IGM's paired IDC.

In various implementations and with reference to FIG. 1, a HB message 1010 is sent from the ICM hosted at, e.g., the computer 16 of gateway 14 (and/or computer 20 of NOC 22) to the IGM hosted at, e.g., the computer 16 of gateway 14 or the computer 20 of NOC 22 illustrated in FIG. 1. The HB message 1010 may include information requests for active and inactive configuration file versions of the IGM as well as, e.g., CQI information requests. If there currently is no inactive configuration file at ICM startup, the inactive version may be set equal to zero (0). An inactive version may be the previous file version, but during a configuration change, the inactive version may also be the next version. The IGM returns a Heartbeat Response (HR) message 1015 to the ICM including its latest versions of the configuration files via satellite 24. The ICM sends a HB message 1020 to the IDC, the HB message 1020 including information request for active and inactive configuration file versions of the IDC via satellite 24. The IDC returns a HR message 1025 to the ICM via satellite 24 with the latest versions of, e.g., configuration files.

In various implementations, the HB message sent to the IGM may also include a flag indicating that the ICM can use to signal to the IGM that it wants the IGM to immediately send its CQI input. This may happen at ICM startup and whenever the ICM has not received any recent CQI input from a particular IGM. The IGM's HR message includes the active and inactive configuration file versions that it currently has for itself and its paired IDC. The HR message may also include an Update In Progress (UIP) flag to indicate when the IGM has noticed one or both of its file versions is not correct and is in the process of acquiring the correct file. This may preempt the ICM from reacting to the version mismatch with a full new file delivery cycle.

In various implementations, the HB message sent to the IDC may only have the active and next IDC file versions. For each file version, the IDC Heartbeat message may also include a flag field used to indicate whether or not the IGM already has the indicated file available for retrieval. This allows the IDC, if there is a version mismatch, to know if it can fix the mismatch itself. The IDC's Heartbeat Response message may include the active and inactive configuration file versions that the IDC currently has. The HR messages may also include a UIP flag to indicate when the IDC has noticed one or both of its file versions is not correct and is in the process of acquiring the correct file from the IGM. This flag may only be set if the HB message indicated that the IGM already has the file the IDC needs. If the IGM does not have the file the IDC needs, the IDC may not set the UIP flag. The version mismatch and the lack of the UIP flag may inform the ICM that it may use the new available files to obtain the correct file to the IGM before the IDC receives it. Even though the IGM is likely to already have noticed its own mismatch and started obtaining the file, the New Files Available (NFA) message that the IGM obtains from the ICM lets the IGM know to send an NFA to the IDC when the file is ready to be selected.

In various implementations, when Dynamic In-route Reconfiguration is enabled, the ICM may receive periodic input from the IGM as to the real-time power and demand requirements of the IGM's currently active terminals. This information is sent to the IGM via CQI Input messages. Since they are sent periodically, CQI messages are not acknowledged. If a CQI message is lost, the ICM continues to use the most recent message. However, if the ICM does not receive any CQI input from a particular IGM for a configurable period of time, the ICM sets the CQI needed flag in the Heartbeat messages sent to the IGM until CQI input is received.

In various implementations, an HB message 1030 is sent to the IGM, and the IGM returns a HR message 1035 to the ICM including its latest versions of the configuration files via satellite 24. The ICM sends another HB message 1040 to the IDC, the HB message 1040 being similar to or the same as HB message 1020. The IDC returns a HR message 1055 to the ICM via satellite 24, the HR message 1055 being similar to or the same as HR message 1025. The IGM may also return CQI information 1050 to the ICM. The above cycle of HB message requests and HR messages may be repeated.

Figure 11:
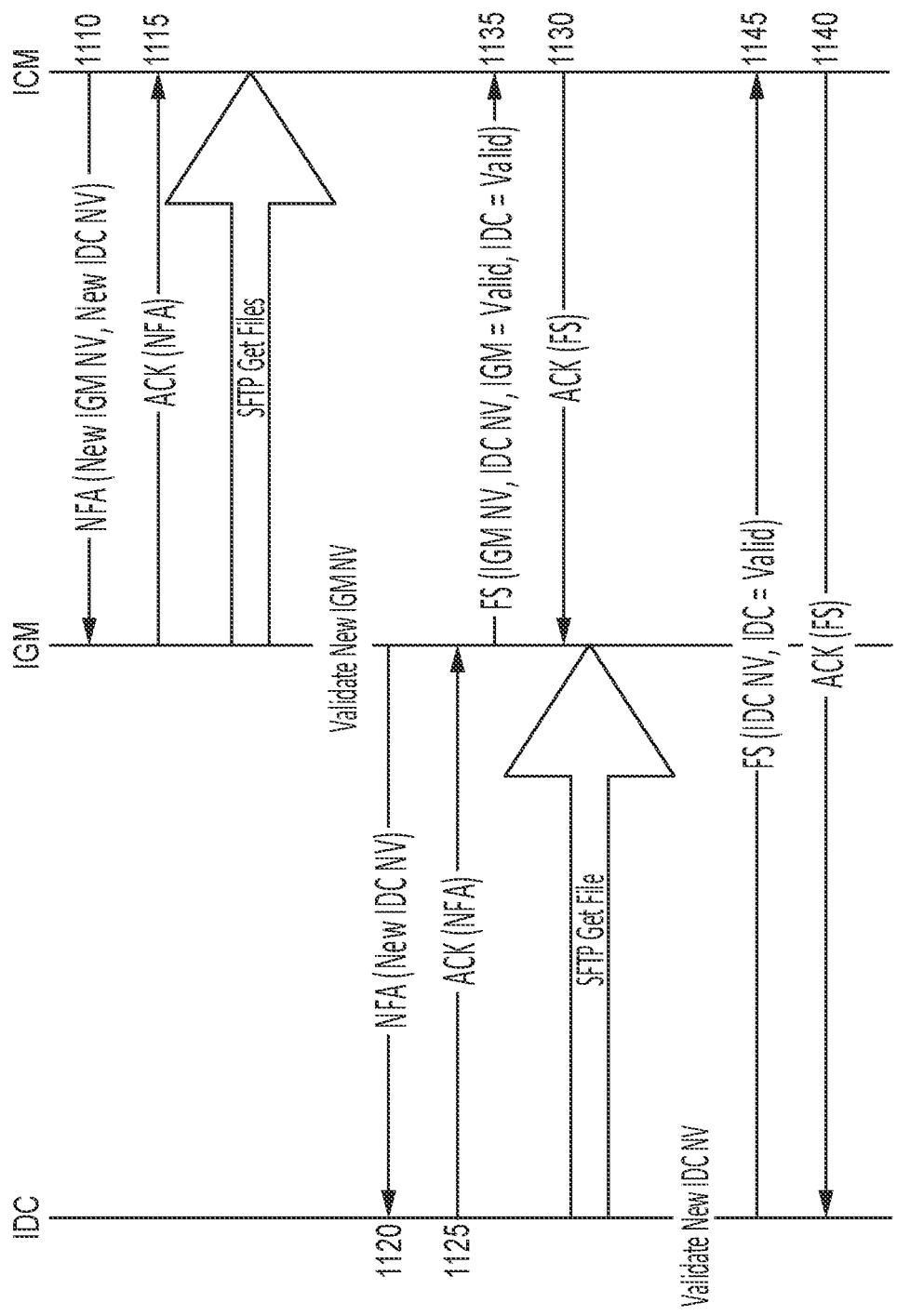
FIG. 11 is a diagram illustrating error-free file exchanges, according to various implementations.

FIG. 11 is a diagram illustrating file exchanges, for example error-free file exchanges, according to various implementations. In various implementations, a standard file transfer protocol (such as, e.g., SFTP) over satellite 24 may be used to obtain configuration and/or exchange files. The IGM and IDC may obtain the new configuration files from the ICM and IGM, respectively. The ICM may send a request 1110 to the IGM, the request including a request for New Files Available (NFA) and receive in return an answer 1120. The IGM sends an NFA request message 1120 to the IDC, and the IDC returns an acknowledgement message 1125 to the IGM. The IGM may obtain IGM and IDC configuration files from the ICM to itself and the IDC obtains IDC configuration files from the IGM to itself. The IGM and IDC files may be stored in a data repository such as, e.g., memory 34 illustrated in FIG. 1. Upon discovery of an error in any of the files, the previous version of compromised files is utilized.

In various implementations, the IGM and IDC know there are new files to obtain when they receive a HB message such as, e.g., messages 1110, 1120 or 1130, which has file version(s) that they do not currently have. The ICM may not send a HB message with a file version which it has not previously attempted to deliver using the New Files Available (NFA) mechanism. Thus, when the IGM or IDC sees a new file version in the HB message, the IGM or IDC obtains the file. The IDC only obtains the new file version until after the IGM has obtained the new file version. In-route layout changes may be started with an NFA message. After the IGM receives a new IDC file in message 1110, the IGM sends a New File Available message 1120 to the IDC letting the IDC know that it can obtain the file. The IGM also sends an NFA message 1120 to the IDC when the IGM obtains an NFA message 1110 from the ICM.

In various implementations, when the IGM obtains a new IGM configuration file from the ICM via message 1110, the IGM performs a health check on the formatting of the file before accepting the file and sends a validation message 1120 to the IDC, and the IDC returns an acknowledgement of the validation in message 1125. After checking the file, the IGM may send a File Status (FS) message 1135 to the ICM and receives an acknowledgement message 1130 form the ICM. If the FS message 1135 indicates that the file is in good condition, the ICM may track that the IGM has the file by sending acknowledgement message 1130. The ICM validates the new configuration file form the IDC when the FS message 1140 received from the IDC indicates that the file does not include an error. The ICM sends an acknowledgement message 1145 to the IDC of the validation. If the FS message 1135 indicates that the file is corrupted or not in unusable condition (or if the IGM is unable to receive the file), the ICM may not switch to the new in-route layout until the error is removed. As a result, the IGM does not validate the contents of the IDC configuration file and responds to validation message 1140 with a no validation in message 1145. The FS message 1135 may include the type of file (IGM or IDC) being reported and the file version in addition to the file status. A single FS message 1135 may be sent by the IGM for both files. In the event, e.g., during error recovery, that only one file is to be updated, the ICM may set the other file to the current Active Version or Inactive Version, whichever corresponds to the one in the NFA message. If the IGM determines that it already has a particular file, the IGM may not retrieve the file, and may send an NFA message to the IDC.

In various implementations, when the IDC obtains a new IDC configuration file from the IGM, the IDC may perform a health check on the formatting of the file before accepting the file. After checking the file, the IDC sends FS message 1145 to the ICM (not the IGM). If the file status indicated in the FS message is that the file is error-free, the ICM may track that the IDC has the file by sending message 1140. Alternatively, if the file status indicated in the FS message is that the file includes errors or is corrupted (or if the IDC is unable for some reason to actually obtain the file), the ICM may not switch to the new in-route layout until the error handling is fixed. If the IDC determines that it already has the file, it sends a FS message 1140 for the file without obtaining the file. Alternatively, the IDC may obtain a new IDC configuration file from the ICM via message 1120. Alternatively, although the above describes a system where the IDC obtains the new configuration file from the IGM, the IDC may obtain the new configuration file directly form the ICM, or the ICM may send the new configuration file as part of the message 1120.

Figure 12:
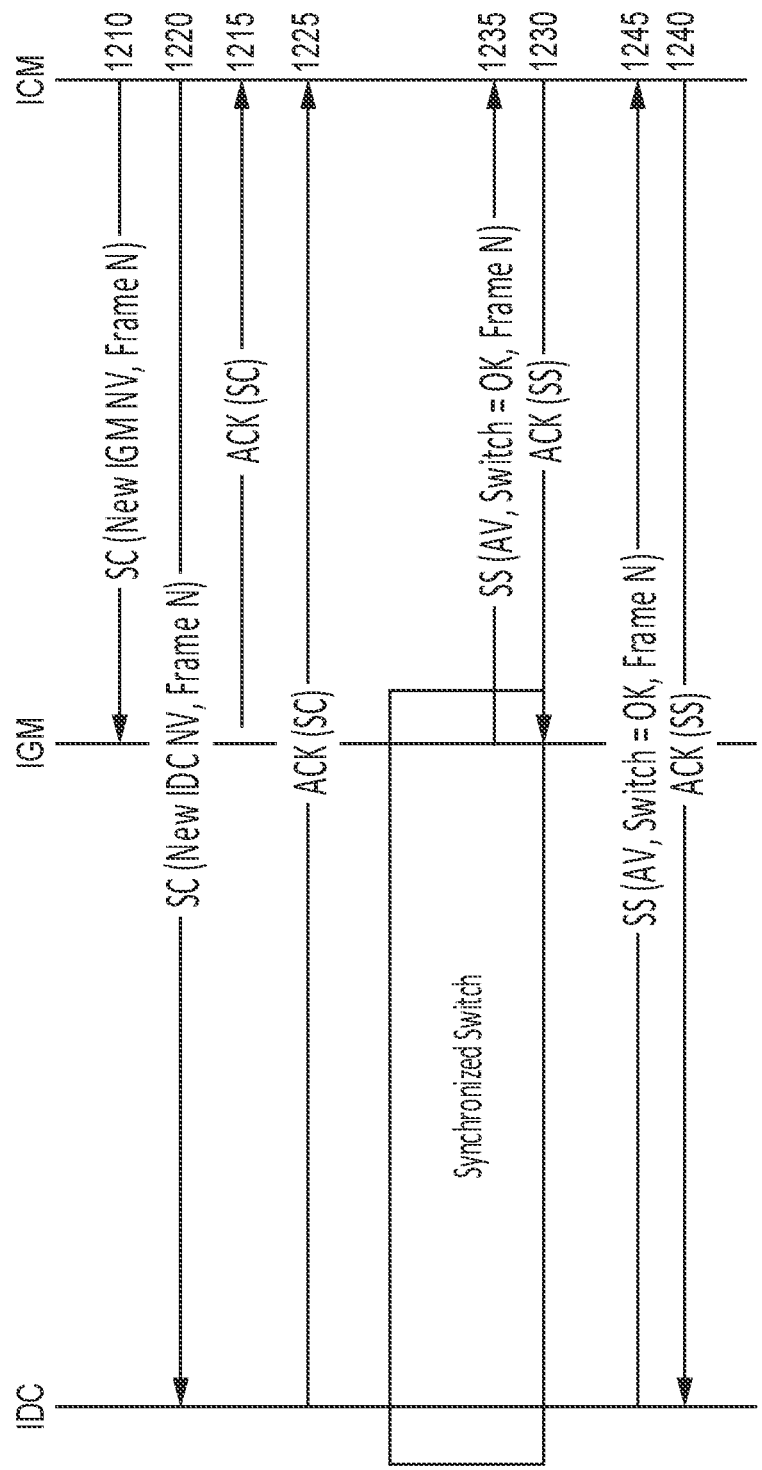
FIG. 12 is a diagram illustrating file switching, according to various implementations.

FIG. 12 is a diagram illustrating file switching, according to various implementations. In various implementations, after distributing new configuration files as discussed above with respect to FIG. 11, the ICM sends a Switch Configuration (SC) command 1210 to the IGM and a SC command 1220 to the IDC to instruct the IGM and the IDC to switch from the active or current version to the next version. The SC commands 1210 and 1220 may include a future in-route Frame Number (on an in-route superframe boundary) where the IGM and IDC may synchronize their switch. To signal to the IGM and/or IDC to immediately switch without synchronization, the Frame Number may be set to 0. This may happen when the switch is being performed because the ICM has detected that the IGM and IDC are not running matching active versions of configuration and, thus, in-route traffic is already impaired. Upon receipt of the SC command 1210, the IGM sends an acknowledgment message 1215, and upon receipt of the SC command 1220, the IDC sends an acknowledgment message 1225.

In various implementations, after the switch is completed, the IGM sends a Switch Status (SS) message 1235 to the ICM, and the IDC sends a SS message 1245 to the ICM to indicate the success (or failure) of their respective switches. The SS message also indicates on which in-route frame the switch happened. The ICM may send an acknowledgment message 1230 to the IGM, and an acknowledgment message 1240 to the IDC, respectively. If the switch was successful, the ICM may start sending HB messages again, updating the version numbers in the HB messages, i.e., the active version is set equal to the next version, as discussed above with respect to FIG. 10.

In various implementations, when a component sends a DIR message, the sender may know if the receiver received the message. Acknowledgement messages (ACK) such as, e.g., message 1215, 1225, 1230 and 1240, may be used for this purpose. Because the message may be lost in transit, the sender sets a timeout when sending the message, and resends the message if an ACK is not received before the timeout expires. All messages may be acknowledged except for ACK messages themselves, heartbeat messages and CQI messages. Heartbeat messages may be sent continuously, and an individual HB or HR message may not be recovered if lost. Another HB message may be sent shortly thereafter. Similarly, CQI messages may be sent periodically and may be replaced by the next message.

In various implementations, three types of timers may be used with the DIR protocol, periodic event timers, response timers and process timers. The sending of HB messages by the ICM and the sending of CQI messages by the IGM may be controlled by periodic timers. Separate timers may be used for sending HB messages to the IGM and the IDC in order to allow separate adjustment for messages which are transmitted via, e.g., a WAN. The default values for the both the IGM and IDC HB timers may be one (1) second. As an example, a value for CQI timer may be five (5) seconds.

In various implementations, response timers control how long the sender waits for an ACK before resending a message. The default values for the response timeouts consider the type of link the messages are traversing, local or wide area. Basically, one (1) second is allowed for WAN traversal and 0.2 seconds is allowed for LAN traversal. Table 5 below summarizes the default values for the various timeouts. Retry count limits go hand in hand with response timers. If after N retries a message is not successfully delivered, error handling kicks in. Default retry levels are also shown in Table 5 below.

TABLE 5

DIR Protocol Default Timeouts

| Type | Function | Sender | Receiver | Default Timeout (sec) | Retry Limit |
|---|---|---|---|---|---|
| Periodic | Heartbeat | ICM | IGM | 1.0 | N/A |
|  |  | ICM | IDC | 1.0 | N/A |
|  | CQI | IGM | ICM | 5.0 | N/A |
| Response | ACK | ICM | IGM | 0.2 | 5 |
|  |  | ICM | IDC | 1.2 | 5 |
|  |  | IGM | ICM | 0.2 | 5 |
|  |  | IDC | ICM | 1.2 | 5 |
|  |  | IDC | IGM | 1.0 | 5 |

In various implementations, process timers may be used internally by the ICM at a macro level to ensure that events complete. When the ICM sends a NFA message to the IGM, e.g., as described above with respect to message 1110 in FIG. 11, the ICM starts a timer to detect that the overall process may have failed. If the ICM does not obtain a FS message from both the IGM and IDC, as discussed above with respect to message 1135 and 1145 in FIG. 11, before the timer expires, which is indicative of an error in the files, the ICM attempts to recover from the issue. Similarly, a timer is started when the SC messages are sent, e.g., messages 1210 and 1220 discussed above with respect to FIG. 12. If the ICM does not receive SS messages from both the IGM and IDC before the timer expires, e.g., as discussed above with respect to messages 125 and 1245 in FIG. 12, the ICM continues to operate on the basis of the current file version, not the new file version because it is assumed that the file switch has not occurred. These process timeouts may set to three (3) seconds. A third process timer may be used to track reporting of CQI input by the IGMs to the ICM. For each IGM, its timer is restarted every time the ICM receives CQI input from the IGM, e.g., as discussed above with respect to HR message 1050 in FIG. 10. If the timer expires, the ICM starts setting the CQI Input Needed flag in the HB message 1010 it sends to that IGM. As an example, the value for the CQI input timer may be 6 seconds.

Figure 13:
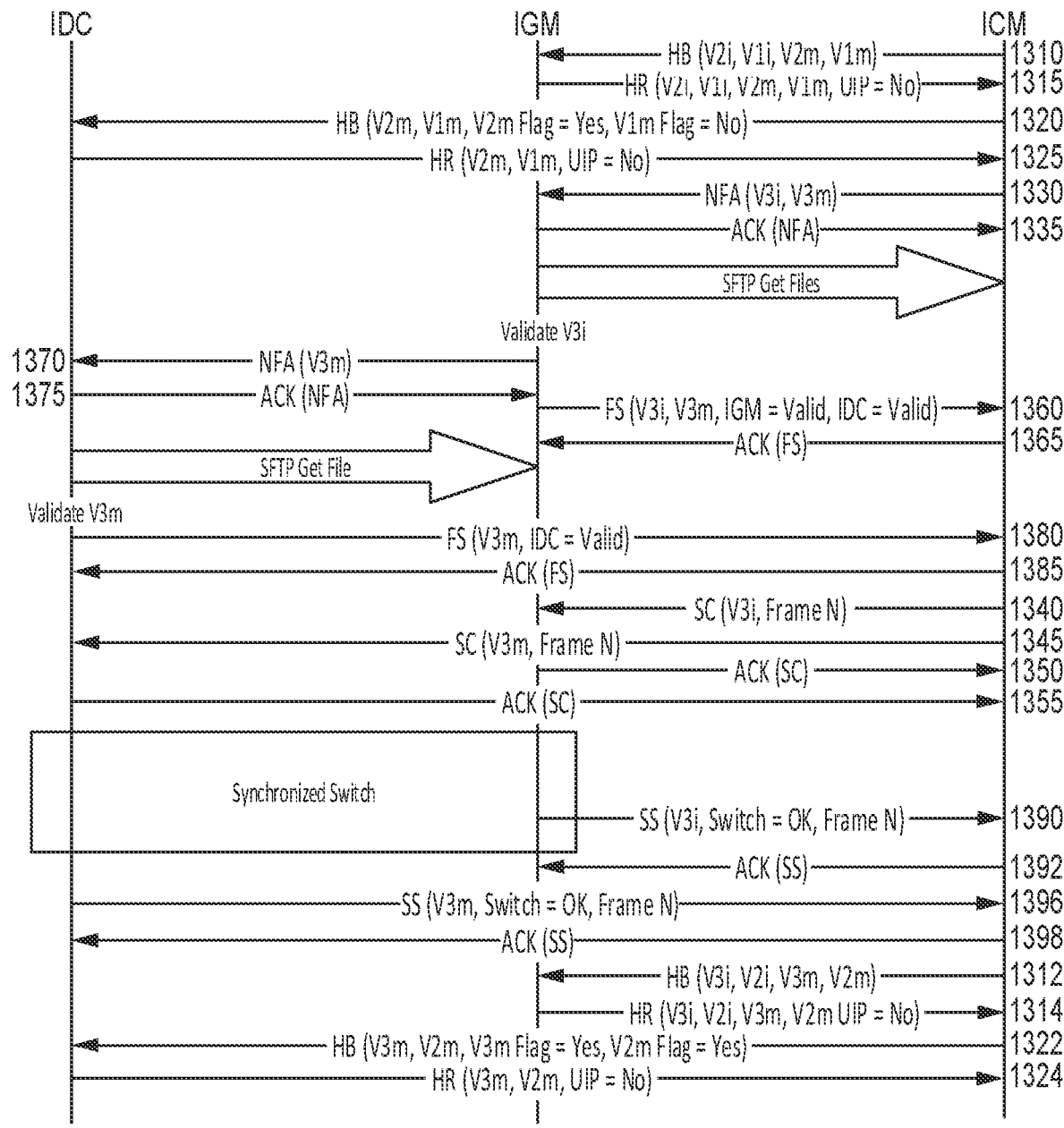
FIG. 13 is a diagram illustrating the distribution and switching of an updated in-route configuration, according to various implementations.

FIG. 13 is a diagram illustrating the distribution of an updated in-route configuration, according to various implementations. In various implementations, FIG. 13 illustrates the process as discussed above with respect to FIGS. 10-12. Once the ICM has created updated in-route configuration for, e.g., an In-route MHz Carveout, the ICM distributes the configuration to the IGMs and IDCs via HB messages 1310, 1320 and 1330, received ACK messages 1315, 1325 and 1335, and subsequently coordinates an in-route configuration switch by sending SC commands 1340 and 1350 and receiving ACK messages 1345 and 1355. The ICM transfers both the IGM and IDC configuration files to the IGM. The IGM reads the configuration file into memory such as, e.g., the memory 34 illustrated in FIG. 1, and ensures that the configuration is valid. If the configuration is valid, the IGM sends a message 1360 to the ICM indicating that it has accepted the configuration update, and the ICM sends an ACK message 1365. The IGM concurrently forwards the IDC configuration file to the IDC in message 1370, and receives an ACK message 1375 from the IDC. This allows a standardized file transfer protocol to be used for all of the configuration file movement. Once received, the IDC reads the configuration file into memory and ensures that the configuration is valid. If the configuration is valid, the IDC sends a message 1380 to the ICM indicating that it has accepted the configuration update, and receives an ACK message 1385. The IDC waits to receive from the ICM instructions to switch configurations.

In various implementations, after both the IGM and IDC have confirmed that the new configuration is valid, the ICM may select a superframe at which to switch configuration and sends it to the IGM and IDC in messages 1390 and 1396, to which ACK messages 1392 and 1398 are sent. More specifically, the ICM may select a frame which is on a superframe boundary. Ideally, the superframe selected is "as soon as possible" but may allow for enough time for the information to be relayed by the IGM to the IDC. Time may also be allowed for proper terminal handling of In-route Group Definition Packets (IGDPs), which may define the symbol rates and the frequencies of the in-routes. The IGM and IDC stage the configuration in preparation for installing the new configuration. As part of staging, the IGM compares the new configuration to the old configuration and determines which in-routes are being deleted and which in-routes are being added. For every In-route Group which has at least one in-route being deleted or added, the IGM sets the Change In Progress (CIP) flag in the IGDP of the In-route Group. In the meantime, the IGM continues normal operation (e.g., allocating bandwidth, performing load balancing, receiving, and forwarding in-route traffic, etc.) using the existing configuration. The IDC may also compare the new configuration to the old configuration and may determine which in-routes are being deleted and which in-routes are being added. The IGM and IDC synchronize changing the configuration. After the changes are made, in response to HR messages 1312 and 1322, the IGM and IDC may each send a message 1314 and 1324 to the ICM indicating that the change has been made.

Figure 14:
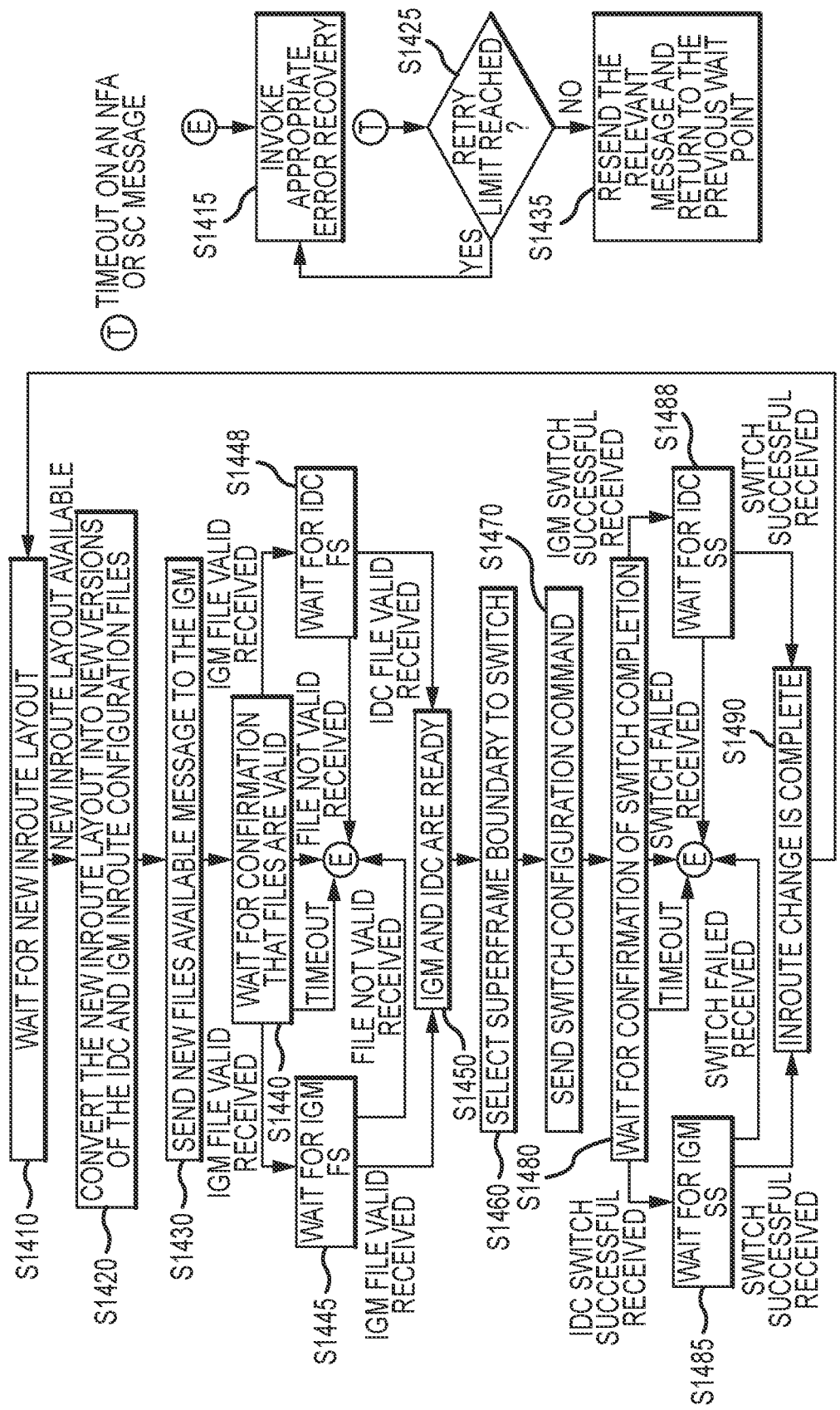
FIG. 14 is a flow chart illustrating an in-route configuration distribution flow, according to various implementations.

FIG. 14 is a flow chart illustrating an in-route configuration distribution flow, according to various implementations, from the perspective of the ICM. The distribution flow process starts at S1410, where the IDC and IGM wait for the dynamic in-route reconfiguration process to generate a new in-route layout. When a new layout is available, the ICM at S1420 may convert the new layout into new, appropriately formatted versions of the IGM and IDC in-route configuration files. The configuration files may be announced to the IGM at S1430 so that the IGM can retrieve the configuration files. After obtaining the IDC file, the IGM in turn announces that the file is available to the IDC file and the IDC retrieves the file. This happens independent from the ICM. The ICM waits at S1440 for confirmation that the IDC and IGM have received their files and agree that the files are valid. If the ICM does not receive confirmation that the files are valid, then the method goes to "E" and sends an error message to invoke an appropriate error recovery.

In various implementations, after both the IGM and the IDC have confirmed that the configuration files have been received and are valid at S1440, the ICM waits for IGM FS at S1445, and/or IDC FS at S1448, and at S1450 determines that the IGM and IDC are ready, and then at S1460 selects a superframe for the configuration switch, and sends switch configuration messages to the IGM and IDC at S1460. The selected superframe boundary may be, for example, at least four (4) superframes (plus message propagation time) in the future to allow time for the IGM to indicate that a change is coming to the satellite terminals. The selected superframe boundary may also be far enough into the future to account for the message propagation time to the IDC but the latter may be significantly less than four superframes and, thus, may not be explicitly accounted for. The ICM at S1470 waits for confirmation messages from the IGM and the IDC indicating that the switch has been made.

In various implementations, if no confirmation message is received from the IGM and the IDC indicating that the switch has been made, then the method goes to "E" and sends an error message to invoke an appropriate error recovery at S1415. In case of error, the method retries sending the message a given number of times. If a maximum number of times is reached at S1425, then the method at S1435 returns to the previous step in the method.

In various implementations, after confirmation messages from the IGM after waiting for the IGM SS at S1485, and from the IDC after waiting for the IDC SS at S1488, indicating that the switch has been made at S1480, the method goes to S1490 where the in-route change is indicated to be complete.

Figure 16:
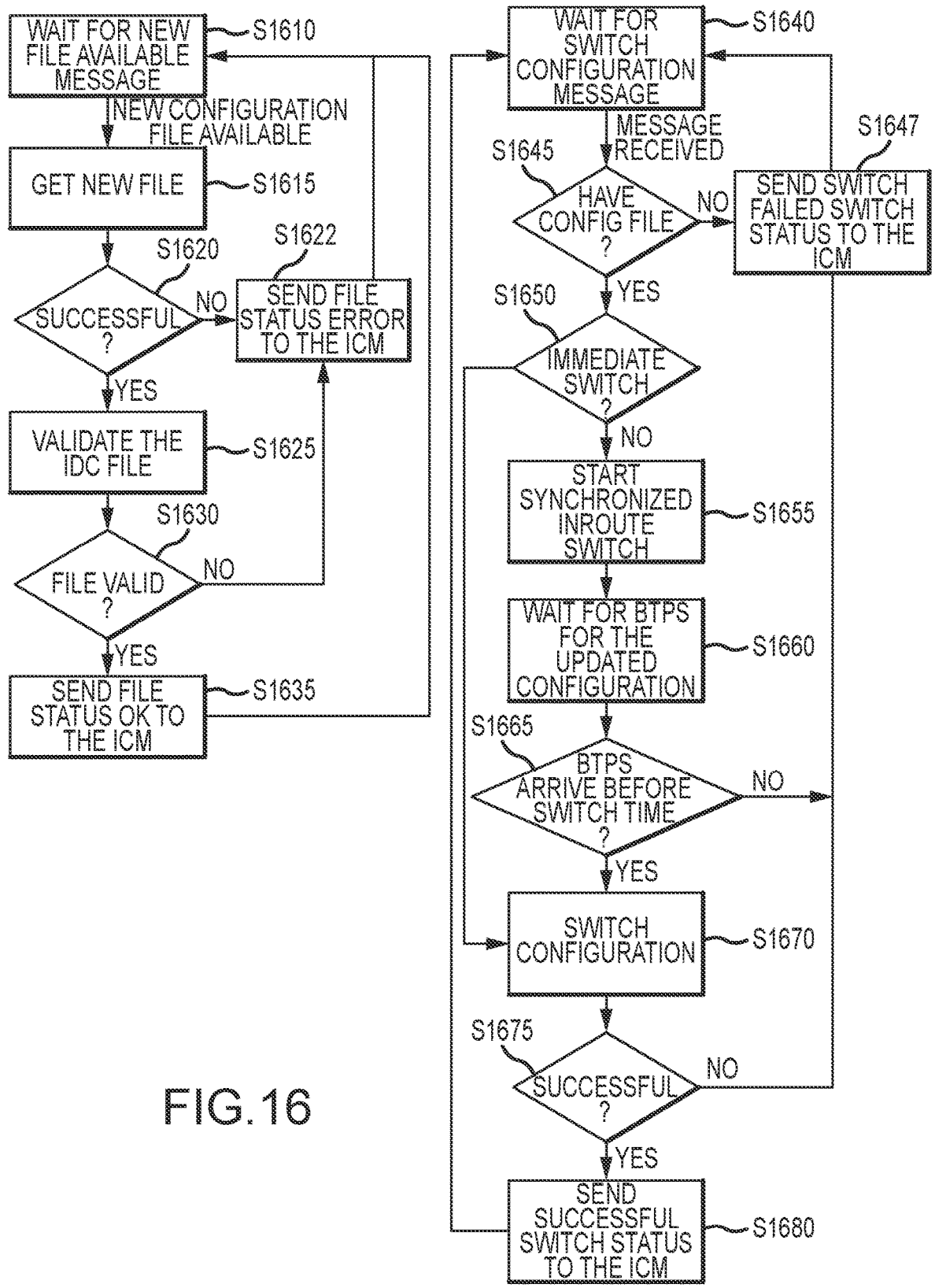

FIGS. 15 and 16 are flow charts illustrating the new configuration file reception and switching logic, for the IGM and IDC respectively, according to various implementations. In FIG. 15, in various implementations, the distribution flow process starts at S1510, where the IGM waits for the dynamic in-route reconfiguration process to generate a new in-route layout. When a new layout is available, the IGM at S1515 receives the layout. At S1520, the IGM determines whether the file transfer is successful. If the transfer is successful, the IGM sends an NFA message at S1525 to the ICM and performs a validation check at S1530 to determine whether the configuration file is valid. If the IGM determines at S1535 that the file is valid, the IGM determines whether a NFA ACK message has been received at S1540. If the IGM determines at S1535 that the file is not valid, a status error message is sent to the ICM. If the NFA ACK message has been received, then the IGM sends a file status acknowledgement at S1545 to the ICM. If the NFA ACK message has been received, then a status error message is sent to the ICM. The IGM waits for switch instructions at S1550, and after receiving the instructions, determines whether the IGM has the configuration file at S1560. If the IGM determines that it has the configuration file at S1560, the IGM starts a synchronized in-route switch with the IDC. At S1570, the IGM completes the switch. The IGM checks whether the switch was successful at S1575. If the switch was successful, a successful switch status is sent to the ICM. If the switch was not successful, an unsuccessful switch status is sent to the ICM. In summary, on the file reception side, the IGM waits for new files to be available, obtains them and processes the new files. When the IGM file is successfully retrieved, the file is validated, and a message is sent to the ICM to indicate whether or not the IGM considers the file valid. Before sending the FS message, the IGM waits for the IDC to ACK the NFA message. If no ACK is received, the file status for the IDC file may indicate an appropriate error. The file remains in memory for use by the switching process which orchestrates a configuration switch when requested by the ICM.

In FIG. 16, in various implementations, the distribution flow process starts at S1610, where the IDC waits for the dynamic in-route reconfiguration process to generate a new in-route layout. When a new layout is available, the IDC at S1615 receives the layout. At S1620, the IDC determines whether the file transfer is successful. If the transfer is successful, the IDC performs a validation check at S1625 to determine whether the configuration file is valid. If the transfer is not successful, the IDC send an error message to the ICM at S1622. If the IDC determines at S1630 that the file is valid, the IGM sends a file status acknowledgement at S1635 to the ICM. If the IDS determines at S1630 that the file is not valid, the IGM sends an error message to the ICM at S1622.

In various implementations, the IDC waits for switch instructions at S1640, and after receiving the instructions, determines whether the IDC has the configuration file at S1645. If the IDC determines that it does not have the configuration file at S1645, then the IDC sends a switch failed status to the ICM at S1647. If the IDC determines that it has the configuration file at S1645, the IDC determines whether it has received instructions for an immediate switch at S1650. If instructions for an immediate switch have been received as S1650, the IDC at S1670 performs the configuration switch. If instructions for an immediate switch have been received as S1650, the IDS starts a synchronized in-route switch with the IGM at S1655. At S1660, the IDC waits for the BTPs for the updated configuration. At S1665, the IDC determines whether the BTPs have been received, and if the BTPs have been received, the IDC at S1670 performs the configuration switch. At S1675, the IDC determines whether the switch has been successful, and if the switch is successful, the IDC sends a successful switch status back to the ICM at S1680. If the switch is not successful, then the IDC sends a switch failed status to the ICM at S1647. In summary, on the file reception side, the IDC waits for new files to be available, obtains them and processes the new files. When the IDC file is successfully retrieved, the IGM sends a NFA message to the IDC. When the IGM file is successfully retrieved, the file is validated, and a message is sent to the ICM to indicate whether or not the IGM considers the file valid.

Figure 17:
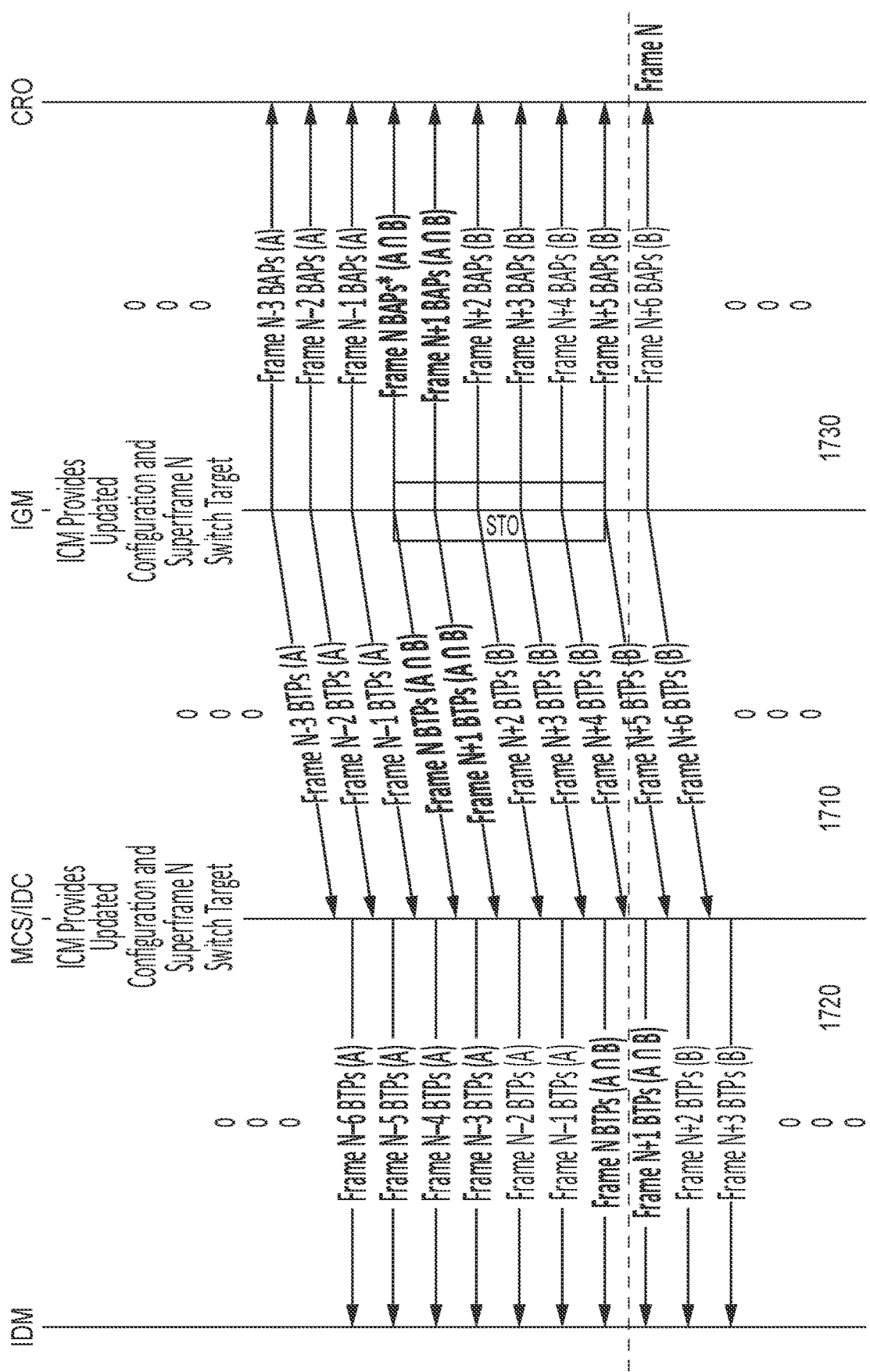
FIG. 17 is a diagram illustrating the synchronization of the IGM and the IDC switch, according to various implementations.

FIG. 17 is a diagram illustrating the synchronization of the IGM and the IDC switch, according to various implementations. In order to minimize the amount of capacity lost during a configuration change, the IGM and IDC may synchronize the changes. During operation, the IGM, IDC and IDM may be synchronizing in-route activity. When the IGM allocates capacity on an in-route, the IGM creates a Burst Time Plan (BTP) in messages 1710 and 1720 for the in-route. The IGM creates Bandwidth Allocation Packets (BAPs) destined for the satellite terminals via messages 1730 for the frame at the same time it creates the BTPs for a frame. The delivery latency for obtaining the BAPs to the satellite terminals may include the same latency, e.g., via a code rate organizer (CRO) or entity that can send control packets to the terminals via the satellite out-route link, that is required to deliver BTPs to the IDC plus the satellite hop. Thus, the BAP delivery requirement may be longer and may be used for both BAPs and BTPs. The BAP delivery requirement is often referred to as the System Timing Offset (STO). The STO shown may be in the order of 150 milliseconds. A small value is used in the illustration in order to reduce the size of the picture. The STO may be in the order of 650 milliseconds. When the IDC receives a BTP, the IDC buffers and loads the BTP into the IDM before the frame to which it applies. The IGM may deliver the BTP to the IDC in messages 1710 in advance so that the IDC has the BTP available when the time comes to load the BTP into the IDM in messages 1720 before the in-route frame to which the BTP applies. The process may account for processing time for creating and using the BTP as well as propagation time for sending the BTP from the IGM to the IDC in messages 1710. Accordingly, when an in-route configuration change occurs, the IGM may switch to the new configuration in advance of when the IDC switches to the new configuration. The IGM may continue to support reception of traffic from in-routes which are in the process of being removed up until the IDC performs the switch.

Figure 18:
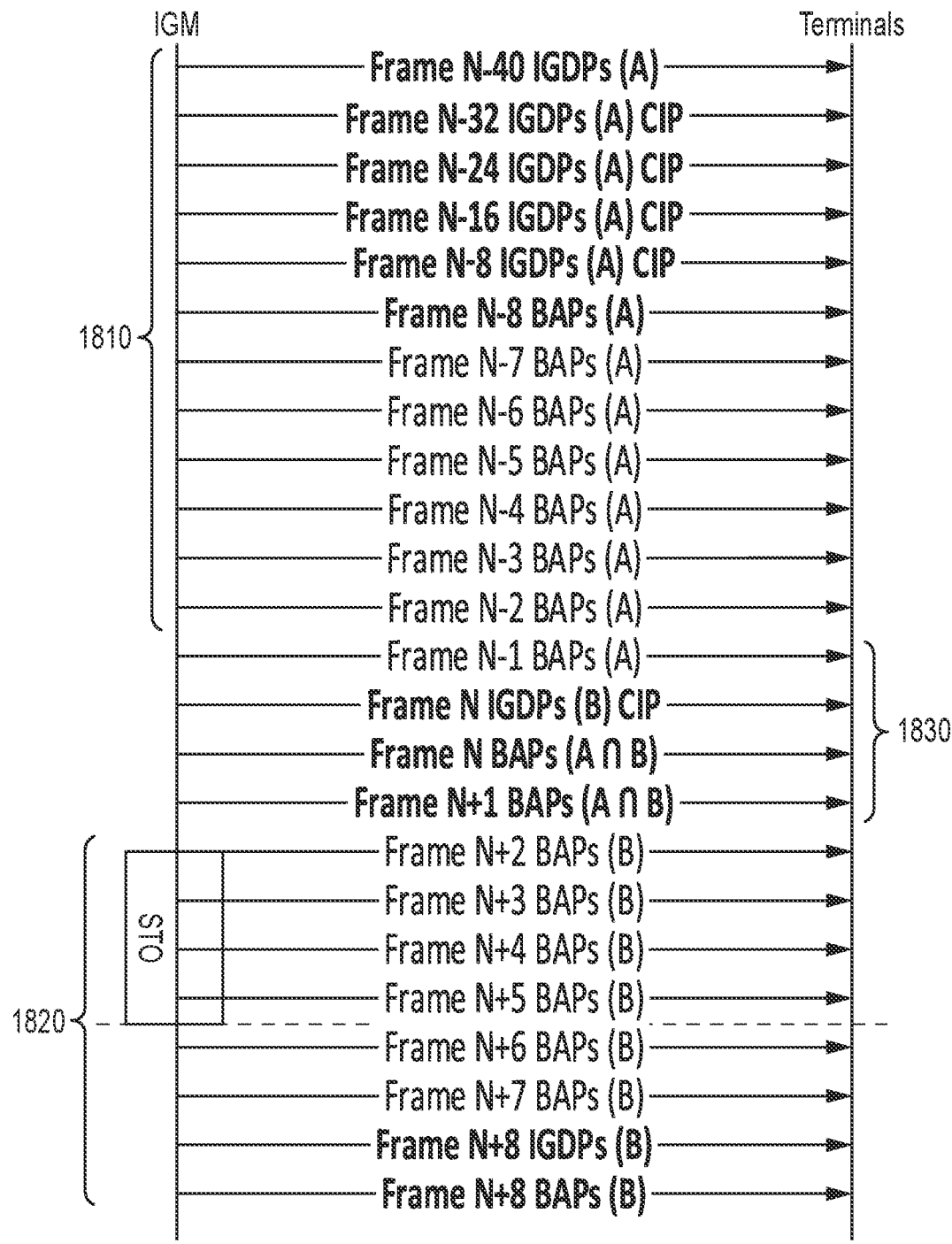
FIG. 18 is a diagram illustrating warning the satellite terminals of an impending change, according to various implementations.

FIG. 18 is a diagram illustrating a warning of the satellite terminals of an impending change, according to various implementations. In various implementations, the IGM sends BAPs and IGDPs to the terminals continuously in messages 1810, once per in-route frame. The BAPs are created far enough in advance to account for processing time and delivery latency to the terminals. When a configuration change is about to occur, the IGM stops sending BAPs for in-routes which are not in both the old and new configuration. Old in-routes which have been removed may no longer exist as of that superframe. In addition, in the absence of an IDM pre-staging capability, the IGM may leave time for new in-routes that are being added to be programmed into the IDM. Two frame times are shown in FIG. 18. After the installation gap time, the IGM starts sending BAPs for all of the in-routes in the new configuration including the newly installed ones in messages 1810. In order to limit the gap time to a few frames (and not an entire superframe), the IGM includes all of the new in-routes in the transition IGDP 1820.

In various implementations, the IGM may not assign any bandwidth for the In-route Group change gap on any in-routes in the In-route Groups which are changing, unless all of the satellite terminals support pre-staging of In-route Group changes Also, the IGM does not assign any bandwidth to terminals on the new in-routes in the BAPs until after the IDC installation gap time, unless the IDM supports pre-staging as illustrated in 1830.

Figure 19:
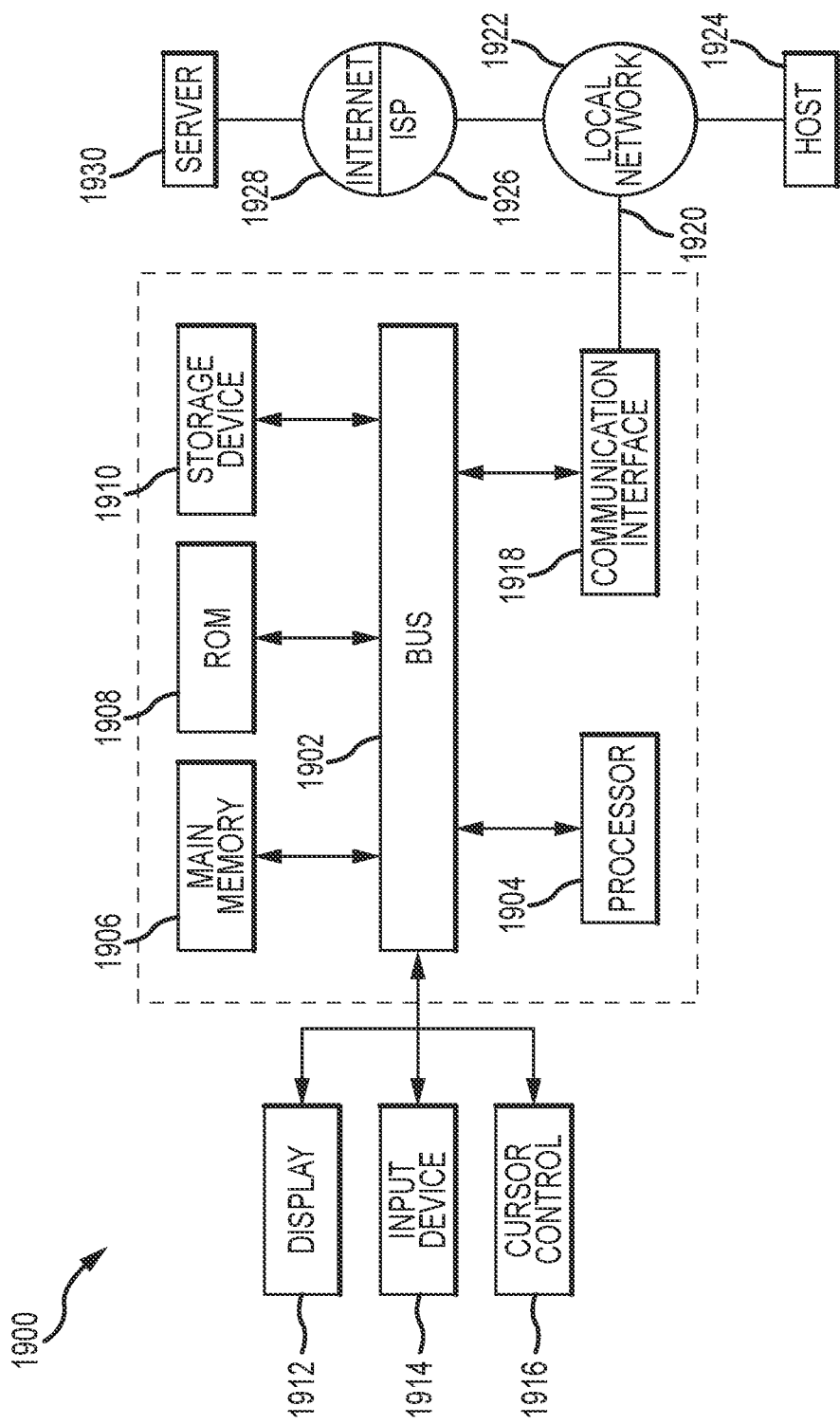
FIG. 19 is a functional block diagram of an example computer system upon which aspects of this disclosure may be implemented.

FIG. 19 is a functional block diagram of an example computer system upon which aspects of this disclosure may be implemented. It will be understood that logic blocks illustrated in FIG. 19 represent functions, and do not necessarily correspond to particular hardware on a one-to-one basis. The computer system 1900 can include a data processor 1904, coupled by a bus 1902 to an instruction memory or main memory 1906, a read-only memory 1908, and a storage device 1910. The instruction memory 1906 can include a tangible medium retrievably storing computer-readable instructions, that when executed by the data processor 1904 cause the processor to perform functions, processes, and operations described herein, for example, in reference to the figures discussed above.

The computer system 1900 can also include a display 1912, a user interface or other input device 1914, and a cursor control 1916, either as separate devices or combined, for example, as a touchscreen display. The computer system 1900 can also include a communications interface 1918, configured to interface with a local network 1922 for accessing a local host server 1924, and to communicate through an ISP 1926 to the Internet 1928, and access a remote server 1930.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of dynamic in-route reconfiguration in a shared bandwidth network, the method comprising:
   receiving at least one of transmit power capability and demand requirements from one or more active network terminals of the shared bandwidth network;
   determining a resulting in-route configuration during operation of the shared bandwidth network based on the received at least one of transmit power capability and demand requirements, wherein determining the resulting in-route configuration comprises exchanging in-route configuration with a process manager;
   comparing the determined resulting in-route configuration to a current in-route configuration;
   when the determined resulting in-route configuration is different from the current in-route configuration, establishing the determined resulting in-route configuration as the current in-route configuration and storing the established current in-route configuration in a dynamic in-route reconfiguration manager; and transmitting the established current in-route configuration to the one or more active network terminals;

wherein establishing the determined resulting in-route configuration as the current in-route configuration comprises:

determining that the determined resulting in-route configuration is in a valid file format;

determining that the one or more active network terminals are ready to accept the determined resulting in-route configuration;

exchanging a switch command with the process manager, the switch command including instructions to replace the current in-route configuration with the determined resulting in-route configuration; and confirming completion of the switch command by the process manager.

2. The method of claim 1, wherein:

the shared bandwidth network comprises a satellite network; and the network terminals comprise satellite terminals.

3. The method of claim 1, wherein the determining the resulting in-route configuration comprises collecting at least one of terminal power feedback and demand requirements from the process manager.

4. The method of claim 1, wherein the determining the resulting in-route configuration comprises determining whether the process manager or one or more of the active network terminals are ready to update the current in-route configuration.

5. The method of claim 1, wherein the receiving the demand requirements comprises receiving bandwidth requirements of at least one of the one or more active network terminals of the shared bandwidth network.

6. The method of claim 1, wherein the determining the resulting in-route configuration comprises:

configuring one or more in-routes at startup of the shared bandwidth network; and dynamically adjusting the configured one or more in-routes based on the received at least one of transmit power capability and demand requirements.

7. The method of claim 1, wherein the receiving the transmit power capability requirements comprises obtaining a maximum power available to the one or more active network terminals in a beam.

8. The method of claim 1, wherein the receiving the demand requirements comprises receiving a distribution of bandwidths assigned to one or more functions of the shared bandwidth network.

9. The method of claim 8, wherein the receiving the distribution of bandwidths comprises receiving a distribution of low speed bandwidth requirements and high speed bandwidth requirements among the one or more active network terminals of the shared bandwidth network.

10. The method of claim 1, wherein the determining the resulting in-route configuration comprises at least one of:

mapping a plurality of bandwidths to one or more of the active network terminals in the shared bandwidth network; and allocating one or more bandwidths to the one or more active network terminals.

11. The method of claim 10, wherein the allocating the one or more bandwidths comprises combining bandwidths on a same satellite link.

12. A system for dynamic in-route reconfiguration in a shared bandwidth network, the system comprising:

a processor;

a memory configured to store executable instructions which when executed by the processor cause the processor to perform functions of:

receiving at least one of transmit power capability and demand requirements from one or more active network terminals of the shared bandwidth network;

determining a resulting in-route configuration during operation of the shared bandwidth network based on the received at least one of transmit power capability and demand requirements by exchanging in-route configuration with a process manager;

comparing the determined resulting in-route configuration to a current in-route configuration;

when the determined resulting in-route configuration is different from the current in-route configuration, establishing the determined resulting in-route configuration as the current in-route configuration and storing the established current in-route configuration in a dynamic in-route reconfiguration manager;

transmitting the established current in-route configuration to the one or more active network terminals;

wherein in order to establish the determined resulting in-route configuration as the current in-route configuration:

the determined resulting in-route configuration is determined to be in a valid file format;

the one or more active network terminals are determined to be ready to accept the determined resulting in-route configuration;

a switch command is exchanged with the process manager, the switch command including instructions to replace the current in-route configuration with the determined resulting in-route configuration; and completion of the switch command is confirmed by the process manager.

13. The system of claim 12, wherein:

the shared bandwidth network comprises a satellite network; and the network terminal comprises a satellite terminal.

14. The system of claim 12, wherein in order to determine the resulting in-route configuration:

one or more in-routes are configured at startup of the shared bandwidth network; and the configured one or more in-routes are dynamically adjusted based on the received at least one of transmit power capability and demand requirements.

15. The system of claim 12, wherein the processor is housed on each of the one or more active network terminals.

16. The system of claim 12, wherein the processor is housed on at least one of a network terminal and a server, the at least one of the network terminal and the server being separate from the active network terminals.

* * * * *